(12) United States Patent
Forsman et al.

(10) Patent No.: US 9,815,141 B2
(45) Date of Patent: Nov. 14, 2017

(54) METHODS AND SYSTEMS FOR USE IN LASER MACHINING

(71) Applicant: General Atomics, San Diego, CA (US)

(72) Inventors: Andrew C. Forsman, San Diego, CA (US); Billy L. Johnson, Ramona, CA (US); Erik H. Lundgren, San Diego, CA (US); Timothy C. Bertch, San Diego, CA (US); Charles P. Moeller, Del Mar, CA (US); James A. Carmichael, Valley Center, CA (US)

(73) Assignee: General Atomics, San Diego, CA (US)

( * ) Notice: Subject to any disclaimer, the term of this patent is extended or adjusted under 35 U.S.C. 154(b) by 253 days.

(21) Appl. No.: 13/708,288

(22) Filed: Dec. 7, 2012

(65) Prior Publication Data

US 2013/0146570 A1 Jun. 13, 2013

Related U.S. Application Data

(60) Provisional application No. 61/568,059, filed on Dec. 7, 2011.

(51) Int. Cl.
*B23K 26/00* (2014.01)
*B23K 26/02* (2014.01)
(Continued)

(52) U.S. Cl.
CPC ............ *B23K 26/18* (2013.01); *B23K 26/389* (2015.10)

(58) Field of Classification Search
CPC ........ B23K 26/00; B23K 26/06; B23K 26/02; B23K 26/08
(Continued)

(56) References Cited

U.S. PATENT DOCUMENTS

| 3,383,491 A | 5/1968 | Muncheryan |
| 4,727,237 A | 2/1988 | Schantz |

(Continued)

FOREIGN PATENT DOCUMENTS

| CA | 2332154 | 7/2001 |
| CN | 101396768 | 4/2009 |

(Continued)

OTHER PUBLICATIONS

Knowles et al.; "Laser Drilling of Fuel Injection Components"; Published before 2010; 10 Pages; Oxford Lasers Ltd.; Abingdon Science Park, Abingdon OX14 3YR, UK.

(Continued)

*Primary Examiner* — Michael Laflame, Jr.
(74) *Attorney, Agent, or Firm* — Fitch, Even, Tabin & Flannery LLP

(57) ABSTRACT

The present embodiments providing methods, systems and apparatuses of protecting a surface during laser machining. In some embodiments, a method of protecting a surface during laser machining comprises: directing a fluid into a cavity of an object being laser machined, where the fluid does not have laser absorption properties; and directing a plurality of laser pulses at a wall of the object being laser machined, where the laser pulses are configured to form a hole through the wall such that at least one laser pulse passes through the hole and enters the cavity while the fluid is directed into the cavity such that the laser pulse is incident on the fluid and a surface together in order to inhibit backwall damage.

24 Claims, 23 Drawing Sheets

(51) Int. Cl.
*B23K 26/18* (2006.01)
*B23K 26/382* (2014.01)

(58) Field of Classification Search
USPC .............. 219/121.7, 121.74, 121.76, 121.85, 219/121.67, 409, 482, 156; 428/43, 130, 428/131, 138, 571
See application file for complete search history.

(56) References Cited

U.S. PATENT DOCUMENTS

| | | | |
|---|---|---|---|
| 4,857,696 A * | 8/1989 | Taeusch et al. ............ | 219/121.7 |
| 5,011,626 A | 4/1991 | Ma et al. | |
| 5,049,722 A | 9/1991 | Corte et al. | |
| 5,227,098 A | 7/1993 | Philby et al. | |
| 5,312,396 A | 5/1994 | Feld et al. | |
| 5,345,057 A * | 9/1994 | Muller ..................... | 219/121.71 |
| 5,656,186 A | 8/1997 | Mourou et al. | |
| 5,742,634 A | 4/1998 | Rieger et al. | |
| 5,790,574 A | 8/1998 | Rieger et al. | |
| 5,994,667 A * | 11/1999 | Merdan et al. .......... | 219/121.67 |
| 5,998,759 A | 12/1999 | Smart | |
| 6,156,030 A | 12/2000 | Neev | |
| 6,303,901 B1 * | 10/2001 | Perry et al. .............. | 219/121.71 |
| RE37,585 E | 3/2002 | Mourou et al. | |
| 6,365,871 B1 * | 4/2002 | Knowles et al. ......... | 219/121.7 |
| 6,407,362 B1 * | 6/2002 | Schmid et al. .......... | 219/121.71 |
| 6,495,769 B1 * | 12/2002 | Saito et al. ................. | 174/255 |
| 6,552,301 B2 | 4/2003 | Herman et al. | |
| 6,574,250 B2 | 6/2003 | Sun et al. | |
| 6,664,498 B2 | 12/2003 | Forsman et al. | |
| 7,027,155 B2 | 4/2006 | Cordingley et al. | |
| 7,411,150 B2 | 8/2008 | Lavers et al. | |
| 7,816,625 B2 | 10/2010 | Beck et al. | |
| 8,242,408 B2 * | 8/2012 | Hu et al. .................. | 219/121.71 |
| 2001/0006168 A1 | 7/2001 | Okumura et al. | |
| 2002/0003130 A1 | 1/2002 | Sun et al. | |
| 2002/0125230 A1 | 9/2002 | Haight et al. | |
| 2002/0166845 A1 | 11/2002 | Cordingley et al. | |
| 2004/0121112 A1 * | 6/2004 | Burns et al. ..................... | 428/81 |
| 2007/0175872 A1 | 8/2007 | Rhoades et al. | |
| 2008/0164240 A1 * | 7/2008 | Cordingley ........ | B23K 26/0604 219/121.61 |
| 2008/0179303 A1 | 7/2008 | Garry | |
| 2009/0020512 A1 * | 1/2009 | Williams ............... | B23K 15/08 219/121.71 |
| 2009/0084765 A1 * | 4/2009 | Muratsubaki et al. .. | 219/121.67 |
| 2009/0236323 A1 | 9/2009 | Sun et al. | |
| 2011/0017715 A1 | 1/2011 | Marcus et al. | |
| 2011/0076405 A1 | 3/2011 | Raji et al. | |

FOREIGN PATENT DOCUMENTS

| | | |
|---|---|---|
| CN | 101578155 | 11/2009 |
| JP | 04262889 | 9/1992 |
| JP | 05-057464 | 3/1993 |
| JP | 07148590 | 6/1995 |
| JP | 09-234582 | 9/1997 |
| JP | 10305382 | 11/1998 |
| JP | 11-145581 | 5/1999 |
| JP | 2001-259868 | 9/2001 |
| JP | 2001526961 | 12/2001 |
| JP | 2007111749 | 5/2007 |
| WO | 89-03274 | 4/1989 |
| WO | 94-26080 | 11/1994 |

OTHER PUBLICATIONS

Hertel et al.; "On the Physics of Material Processing with Femtosecond Lasers"; Jan. 2001; pp. 23-30; RIKEN Review No. 32; Max Born Institute, Germany.

PCT; International Search Report and Written Opinion of the International Search Authority for International Patent Application No. PCT/US2012/068499; dated Mar. 21, 2013; 12 Pages.

Notice on the First Office Action for Chinese Patent Application No. 201280069112.1 mailed from the State Intellectual Property Office of the People's Republic of China dated May 21, 2015.

Office Action for Russian Patent Application No. 2014126634 mailed from the Russian Patent Office dated Dec. 15, 2016.

Preliminary Reason for Rejection for Japanese Patent Application No. 2014-546128 mailed from the Japanese Patent Office dated Oct. 18, 2016.

European Search Report for EP Application No. 12855395.5 mailed from the European Patent Office dated Oct. 27, 2015.

Notice on the Second Office Action for Chinese Patent Application No. 201280069112.1 mailed from the State Intellectual Property Office of the People's Republic of China dated Feb. 26, 2016.

SIPO of China; Notice on the First Office Action for Chinese Patent Application No. 201610319655.4 mailed from The State Intellectual Property Office of The People's Republic of China on Jun. 21, 2017.

* cited by examiner

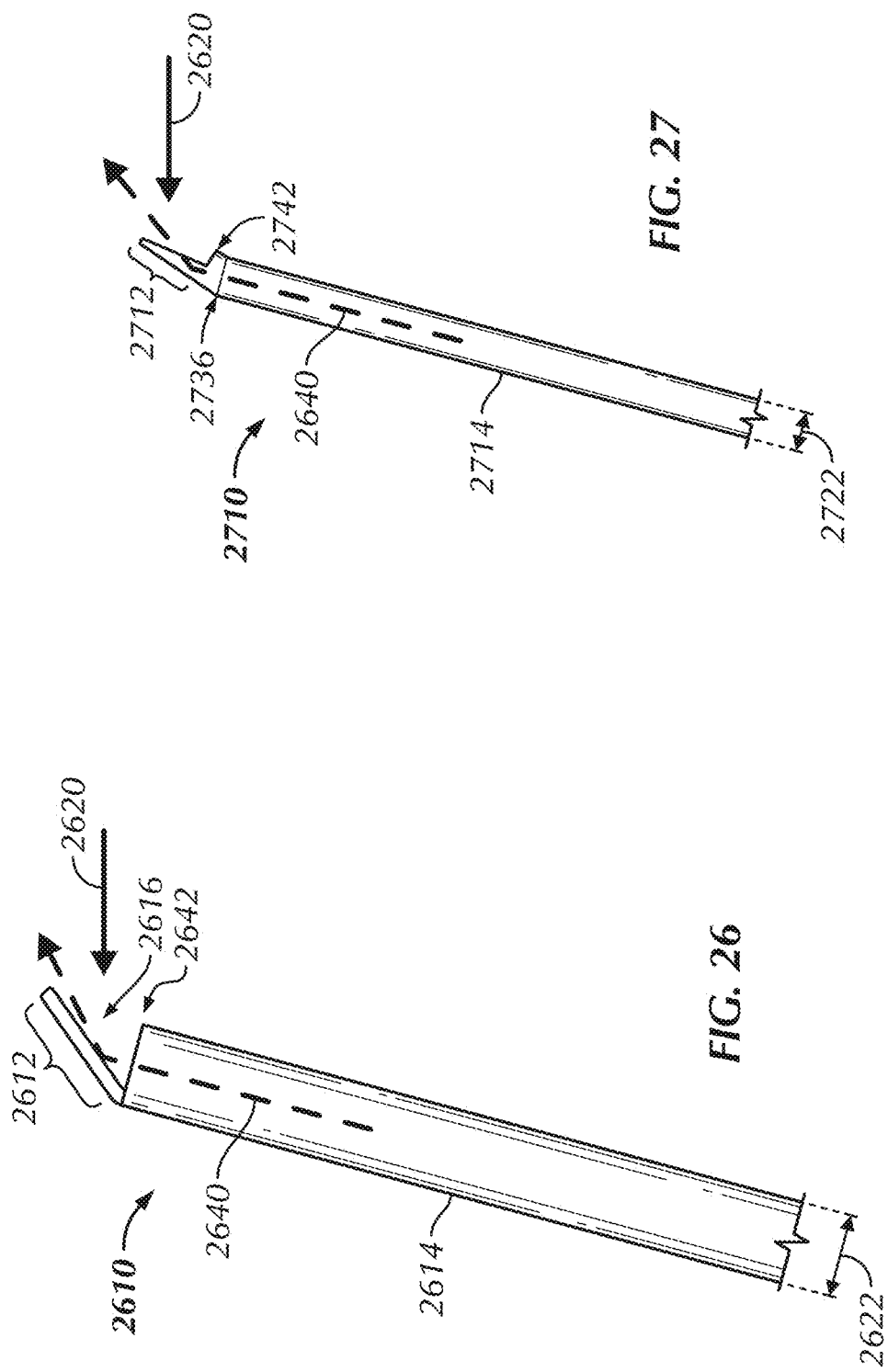

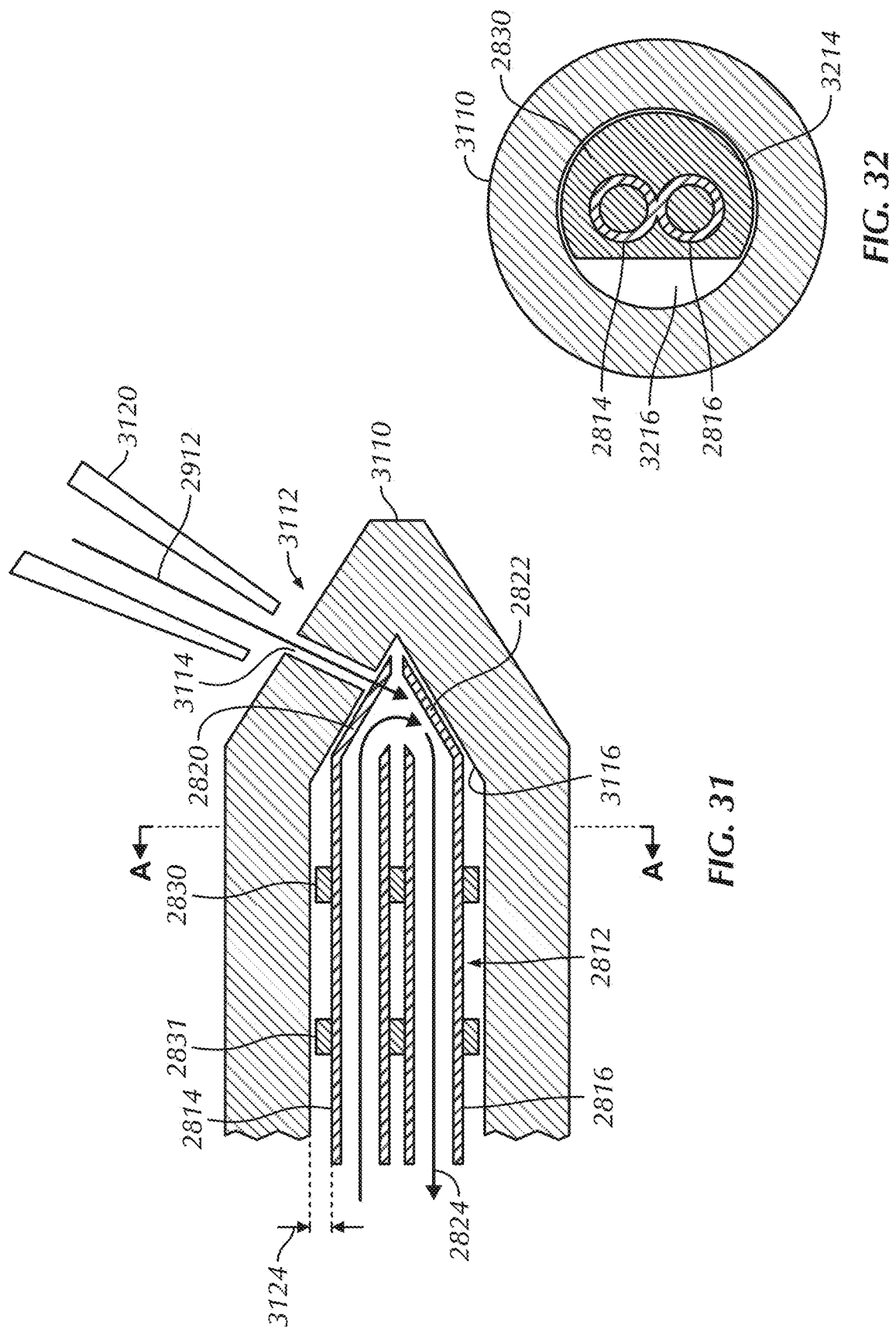

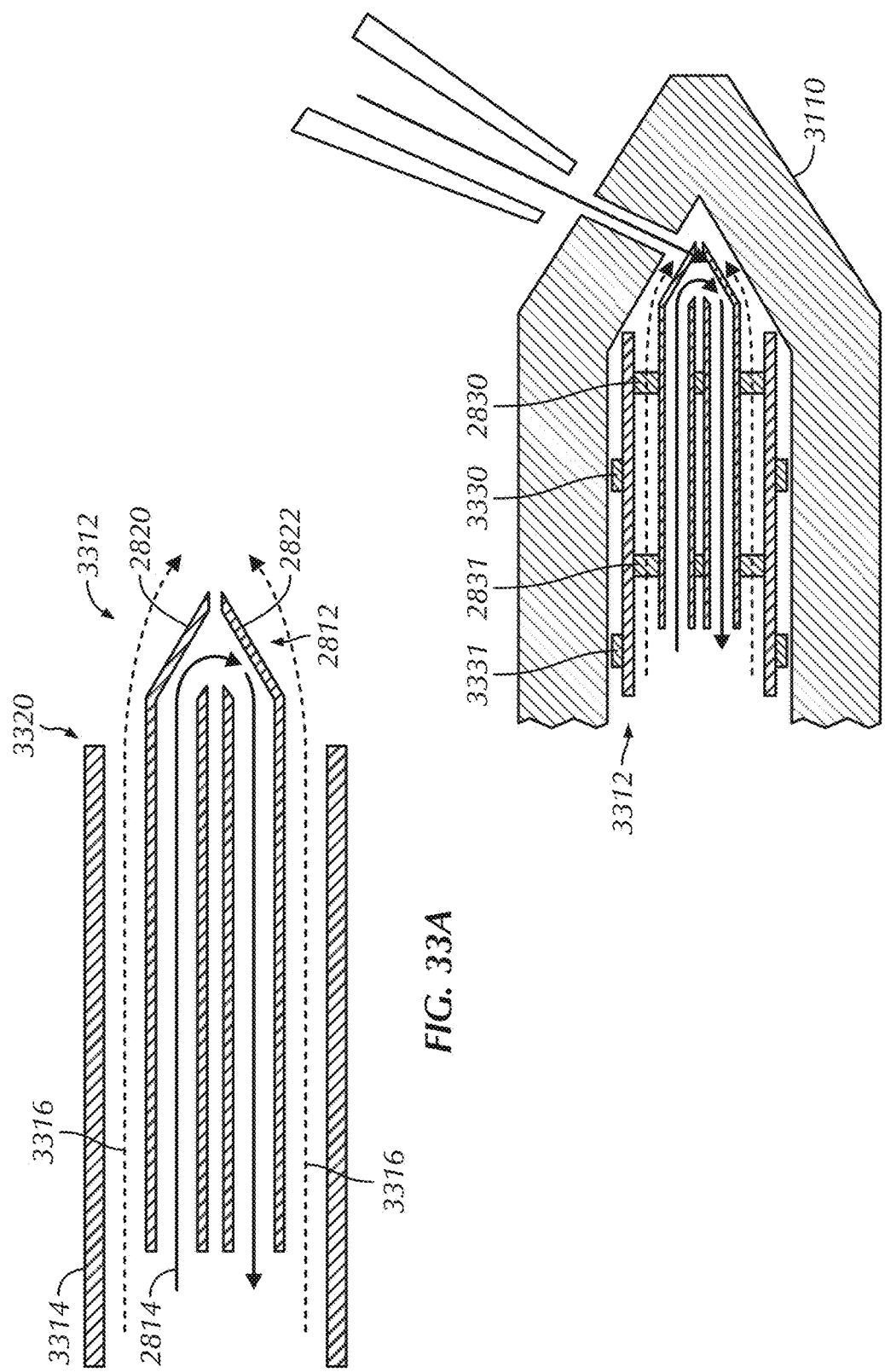

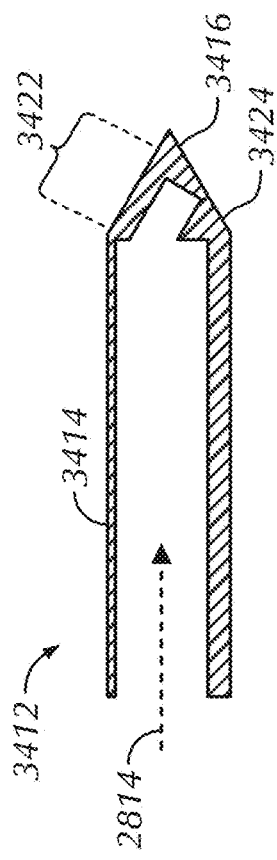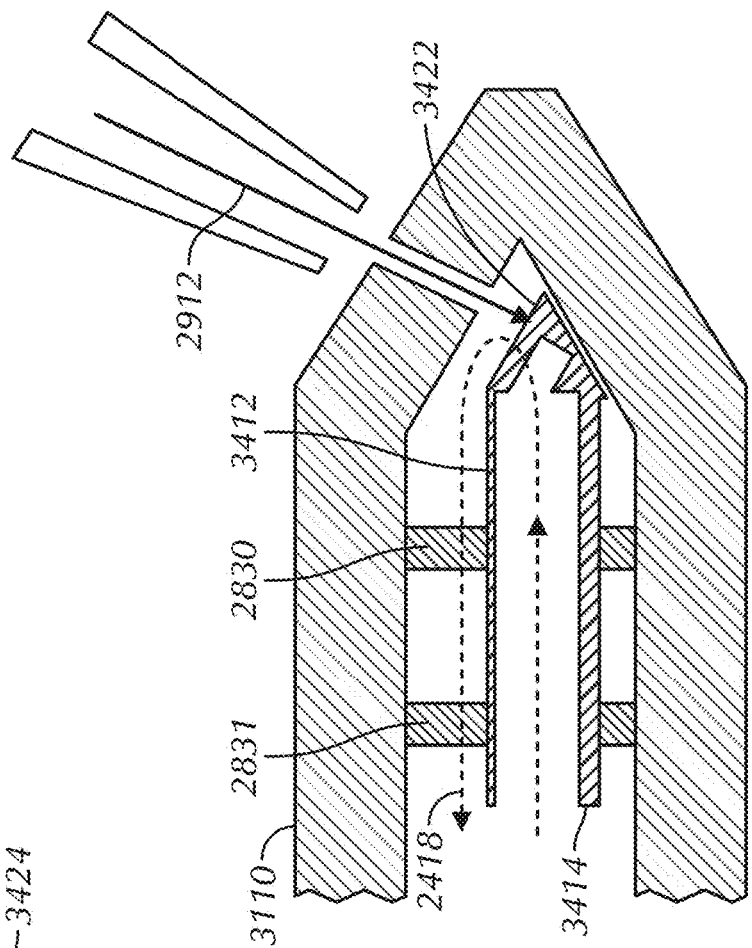

METHODS AND SYSTEMS FOR USE IN LASER MACHINING

This application claims the benefit of U.S. Provisional Application No. 61/568,059, filed Dec. 7, 2011, for Forsman et al., entitled METHODS AND SYSTEMS FOR USE IN LASER MACHINING, which is incorporated in its entirety herein by reference.

BACKGROUND

1. Field of the Invention

The present invention relates generally to laser machining, and more specifically to protection from unwanted laser strikes on a workpiece.

2. Discussion of the Related Art

In laser machining, a series of laser pulses is impacted against a target workpiece in order to drill a hole through the workpiece. However, laser energy typically either goes through the workpiece or is reflected off the workpiece, and then propagates to an area or other surface of the workpiece and causes damage to the workpiece. For example, the laser energy results in damage to a backwall or through surface of the workpiece opposite the portion of the workpiece where the hole is formed. Typical approaches to mitigate this backwall damage include the introduction of a fluid medium between the surface to be drilled and the backwall surface of the workpiece, where the fluid includes laser barrier or absorptive properties such as light absorbing particles, pigment particles, dye-stuff, fluoresce particles or an oil/water emulsion with light scattering properties.

SUMMARY OF THE INVENTION

Several embodiments of the invention advantageously address the needs above as well as other needs by providing methods of protecting a surface during laser machining. In some embodiments, methods of protecting a surface during laser machining comprise: directing a fluid into a cavity of an object being laser machined, where the fluid does not have laser absorption properties; and directing a plurality of laser pulses at a wall of the object being laser machined, where the laser pulses are configured to form a hole through the wall such that at least one laser pulse passes through the hole and enters the cavity while the fluid is directed into the cavity such that the laser pulse is incident on the fluid and a surface together in order to inhibit backwall damage.

Some embodiments provide systems for use in protecting surfaces during laser machining, comprising: a protection substrate configured to be positioned within a cavity of an object to be laser machined such that laser pulse performing the laser machining is incident upon the protection substrate when the laser pulse passes through a hole in the object formed through laser machining and enters the cavity, where the laser pulse is inhibited from impinging on a back surface of the object across the cavity from the hole; a fluid source positioned relative to the protection substrate, where the fluid source is configured to direct a fluid onto the protection substrate.

In other embodiments, methods of laser machining comprise: configuring a laser source relative to an object to be laser machined, where the object to be machined has an interior cavity at a portion of the object to be laser machined; controlling the laser source to produce a series of laser pulses; supplying a fluid into the cavity while performing the controlling of the laser source; and controlling which of the laser pulses are directed at a portion of the object where a hole is to be produced such that less than all of the laser pulses are directed at the object where a timing between pulses that are directed at the object provide protection of a backwall of the object from damage that would otherwise be caused by one or more of the laser pulses directed at the object.

BRIEF DESCRIPTION OF THE DRAWINGS

The above and other aspects, features and advantages of several embodiments of the present invention will be more apparent from the following more particular description thereof, presented in conjunction with the following drawings.

FIGS. 26 and 27 show images of protection systems with protection substrates, in accordance with some embodiments.

FIG. 31 illustrates a simplified, partial cross-sectional view of a portion of the protection system of FIG. 28 positioned within an exemplary object being laser machined, in accordance with some embodiments.

FIG. 32 shows a simplified, cross-section view of the protection system of FIG. 31 at axis A-A, in accordance with some embodiments.

FIG. 33A shows simplified, cross-sectional view of a portion of a laser protection system, in accordance with some embodiments.

FIG. 33B illustrates a simplified, partial cross-sectional view of a portion of the laser protection system of FIG. 33A positioned within an exemplary object being laser machined, in accordance with some embodiments.

FIG. 34A shows simplified, cross-sectional view of a portion of a laser protection system, in accordance with some embodiments.

FIG. 34B illustrates a simplified, partial cross-sectional view of a portion of the laser protection system of FIG. 34A positioned within an exemplary object being laser machined, in accordance with some embodiments.

Figure 1:
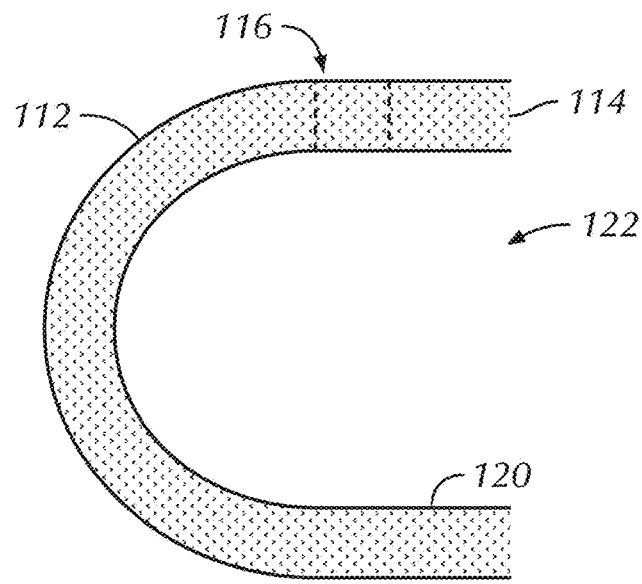
FIG. 1 depicts a simplified, cross-sectional view of an object to be laser machined.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 depicts a simplified diagram, cross-sectional view of an object 112 to be laser machined or tooled. For example, the laser machining can intend to laser drill a hole through a wall 114 of the object 112 at a predefined position 116. In some instances, however, the laser machining may cause damage to a surface 120 opposite the wall being machined as the laser pulses performing the machining penetrate the wall 114 and enter a cavity 122 of the object and impact the surface 120. For simplicity, the surface 120 opposite the wall being machined is referred to below as a backwall surface.

Figure 2:
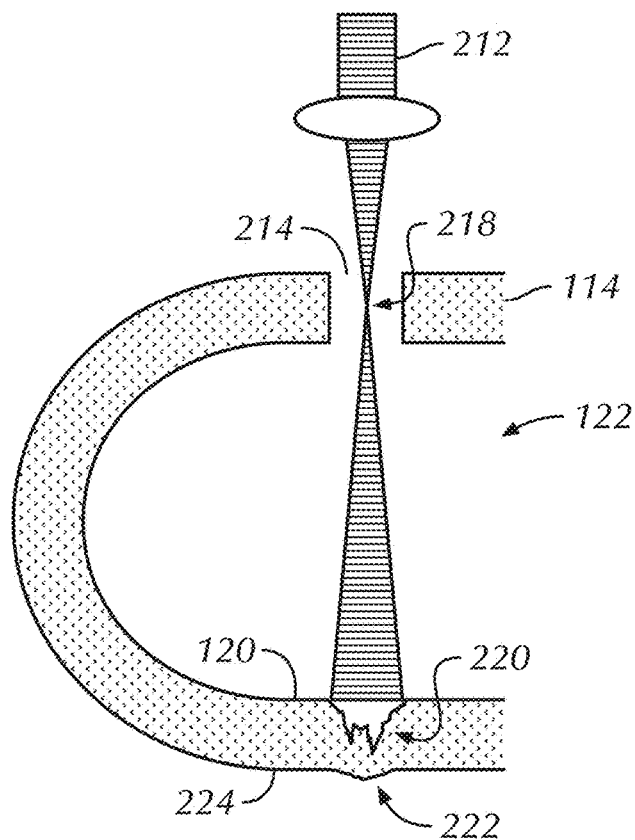
FIG. 2 depicts a simplified, cross-sectional view of the object of FIG. 1 during laser machining as a laser pulse penetrates the wall and causes damage to a backwall surface.

FIG. 2 depicts a simplified diagram, cross-sectional view of the object 112 during laser machining as a laser pulse 212 penetrates the wall 114. During the laser machining the laser pulses form a hole 214 in the wall 114. Typically, one or more additional laser pulses are directed at the object to achieve a desired hole size and/or quality. Accordingly, at least a portion of those laser pulses directed at the object after an initial hole is established penetrate through the hole 214, enter the cavity 122 and can impinge upon the backwall surface 120. Accordingly, the laser pulse 212 impinging on the backwall surface 120 can cause damage 220 to the backwall surface, particularly when the backwall surface 120 is relatively close to the hole 214. The amount of damage that may result can depend on many factors including, but not limited to the distance between a focus 218 of the laser pulse 212 and the backwall surface 120, the intensity and/or power of the laser pulse, the rate or angle of dispersion of the laser pulse, the duration of laser pulse exposure on the backwall surface 120, polarization, pulse energy and other such factors including the depth of the hole being drilled, the material, the size, and the taper.

It is noted that the purpose of laser machining is typically intended to generate the hole 214 or other gap within the wall 114 and accordingly the laser pulse 212 passing through the hole 214 impinging on the backwall surface 120 is likely to cause damage, particularly when the backwall surface is relatively close to the laser focus 218. In some instances, the damage 220 may be extensive enough to cause exterior damage 222 to an exterior surface 224 and/or produce an unwanted hole through the wall defining the backwall surface 120. Accordingly, some embodiments provide systems, apparatuses, methods and processes of limiting and/or preventing damage to the backwall surface 120.

Figure 3:
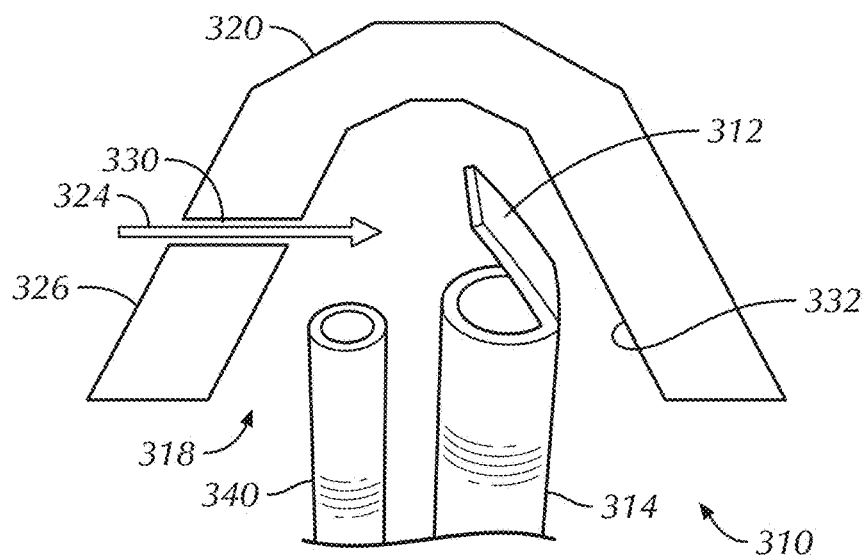
FIG. 3 depicts a simplified diagram of a protection system according to some embodiments.

FIG. 3 depicts a simplified diagram of a protection system 310 according to some embodiments. The protection system 310 includes a protection substrate 312 that extends from a support 314. The support is configured to be positioned within a cavity 318 of an object 320 being laser machined and to position the protection substrate 312 at a location within the cavity 318 in the path of the laser pulse 324.

During laser machining, the laser pulse 324 is directed at a wall 326 of the object 320. For example, in some instances, a series of laser pulses are directed at the wall 326 forming a hole 330 in the wall. As a series of laser pulses penetrate the wall the laser pulses can continue across the cavity 318 and to impinge on the protection substrate 312. Accordingly, the protection substrate 312 limits and in some instances prevents the laser pulses from impinging on a backwall surface 332 and prevents damage to the backwall surface.

In some embodiments, the support 314 can further comprise and/or be formed from a conduit that couples with a fluid source (not shown in FIG. 3). Accordingly, the fluid conduit 314 can supply a fluid into the cavity 318, and typically is supplied so that the fluid contacts the protection substrate 312. Further, in some embodiments, the conduit is configured to direct the fluid to impact a surface of the protection substrate 312. Accordingly, the fluid from the conduit is in contact with the surface upon which the laser pulses impinge. The fluid restricts the expansion of plasma formed at the surface thereby helping to reduce the increase in local laser absorption that would accompany the longer gradients of protection substrate material that would otherwise exist and in at least some instances helps to maintain a reflectivity of the surface to reflect at least some of the laser pulses. The reflected laser pulses continue to spread reducing the intensity and the likelihood of causing further damage to the interior surfaces of the cavity. The fluid further helps in dissipating heat and limits plasma production surface degradation of the protection substrate 312. Further, the fluid can limit splatter of material as a result of laser machining and potential damage of coatings on interior surfaces of the object as a result of splattering. In some instances, the fluid may be cooled and pressurized in the conduit such that upon release it tends to freeze.

The object 320 can be oriented, in some implementations, to aid in the removal of the fluid introduced into the cavity 318 and/or to allow excess fluid impacting the protection substrate 312 to be drawn away from the protection substrate, which can provide a flow of fluid over the protection substrate and increasing a cooling effect provided by the fluid. For example, in some implementations, the object can be positioned such that the gravity drains the excess fluid from the cavity at a rate that is at least equal to or in excess of the rate at which the fluid is delivered by the fluid conduit 314. Additionally or alternatively, a vacuum force can be applied to aid in the removal of the fluid. In many embodiments, it is important to maintain fluid contact with the protection substrate 312 and to not flood the hole 330 being drilled with fluid. Accordingly, the fluid flow onto the portion of the protection substrate 312 being struck by the laser, and subsequently into the cavity 318, is regulated. If the fluid flow rate is too low then the protection substrate 312 may not remain adequately coated, and if the flow rate is too high then it may prove difficult or impossible to keep the fluid from entering the vicinity of the hole 330 being drilled. These two competing factors may be less stringent when the cavity is larger. Some laboratory tests for some cavity sizes and laser powers performing drilling for certain size holes have shown that the flow rate is of the order of about 1 m/s or more, such as during laser machining with pulse rates of about 2000 pulses per second.

In some embodiments, the protection system 310 further includes a gas conduit 340, which is configured to also be positioned within the cavity 318. Further, the gas flow conduit can be positioned relative to a portion of the cavity where the hole 330 is being drilled. A gas, such as air, oxygen or other relevant gas can be directed into the cavity to limit, and in some instances, prevent the liquid supplied by the fluid conduit 314 from entering the hole 330 once formed by the laser machining. For example, an exit aperture of the gas conduit 340 can be positioned to direct a flow of gas across the hole 330 and can force fluid away from the hole. Additionally or alternatively, in some instances one or more external gas streams or jets can be directed relative to the hole 330 being tooled. The internal air jet and/or the external air jets also play a role in keeping the fluid from entering the hole 330 and/or vicinity of the hole being drilled. In some embodiments, the external air jet is arranged to be generally coaxial with the drilling laser (e.g., by focusing the laser through a hole or conduit of a gas delivery nozzle). A substantial pressure on the external air jet (e.g., measured in 10's of PSI or the like, which may depend on the size of the hole being drilled, the pulse rate and/or other tooling being performed), combined with a very modest supply rate to the internal air jet, greatly assists in clearing water from the vicinity of the hole being drilled. It can further be important to regulate the air flow to the internal air jet so that fluid is cleared from the hole 330 being drilled, but not so much that it blows the fluid out of contact with the protection substrate 312.

Figure 4:
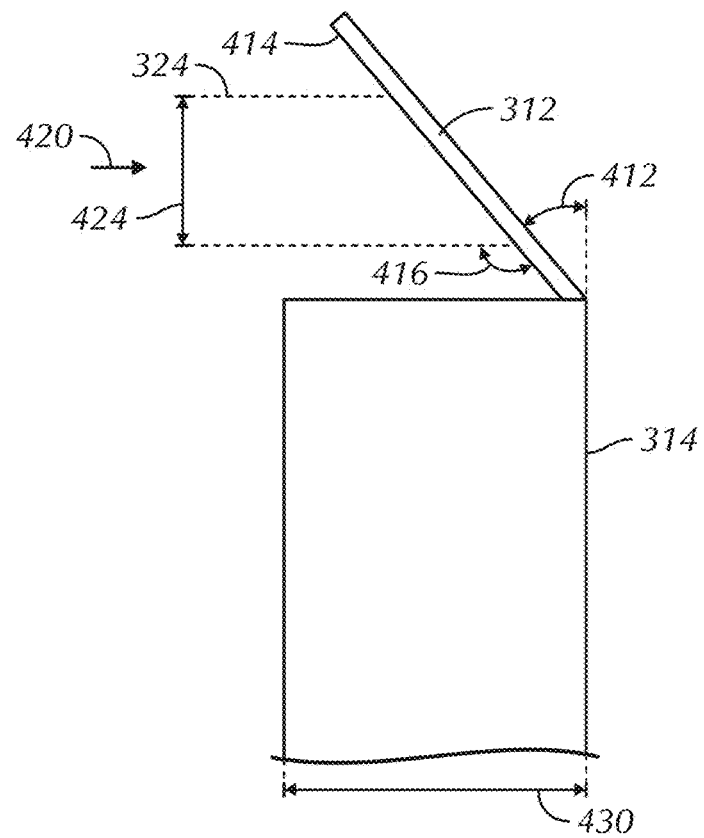
FIG. 4 depicts a simplified diagram of a protection substrate cooperated with a fluid conduit, in accordance with some embodiments.

FIG. 4 depicts a simplified diagram of the protection substrate 312 cooperated with the fluid conduit 314. In some embodiments, the protection substrate 312 is positioned at an angle 412 relative to the fluid conduit 314. As fluid exits the fluid conduit it can be of sufficient force to directly impact a first surface 414 of the protection substrate 312. Similarly, the protection substrate 312 can be configured so that when the protection system 310 is positioned within the cavity 318, the protection substrate 312 is at an oblique angle 416 relative to the path, direction of travel or axis 420 of the laser pulse 324. As such, the laser pulse can be dispersed over a greater area of the protection substrate 312. Although this can be the case in some embodiments, it is not always necessary. For example, in some instances the protection substrate 312 can be positioned perpendicular to the laser pulse 324. The configuration, orientation, angle and the like of the protection substrate 312 relative to the axis of the laser 420 can, in some implementations, be selected to better cooperate with and/or protect the device being protected. For example, the inside of most fuel injectors is cone shaped, and accordingly, the protection substrate can be positioned at an angle to the laser beam to more easily fit into the cavity. In other embodiments, the protection substrate may have an alternative configuration, such as a cone or conic shape, parabolic, or other such shape having a desired angle relative to the axis 420 of the laser pulse 324. In other instances, the protection substrate may have alternative shapes such as circular, spherical, tubular or other relevant shapes. Additionally or alternatively, in some embodiments the protection substrate can be moved or rotated distributing the exposure to the laser pulses over a greater area and/or increasing the cooling of the protection substrate. For example, in some instances, the protection substrate can be radially symmetric (e.g., a tube shaped with holes formed in the surface). Further, the protection substrate can, in some embodiments, be rotated to change the area of the surface of the protection substrate upon which the laser impinges.

The protection substrate 312 can be configured from one or more of numerous materials. In some embodiments, the protection substrate 312 is an extension of the fluid conduit 314. For example, the fluid conduit 314 can be cut proximate the end to form the protection substrate 312. Further, the cut protection substrate 312 can be shaped and/or bent to a desired angle 412. In yet other embodiments, the protection substrate 312 is cut or formed with a desired angle and fixed or otherwise secured with the fluid conduit 314. The dimensions of the protection substrate 312 can further be configured depending on the size of the cavity 318, the expected height, width and/or diameter 424 of the laser pulse 324. Similarly, the size or diameter 430 of the protection conduit can depend on the size of the cavity, and expected amount of fluid to be delivered, the size of the laser pulse, the size of the protection substrate 312 and/or other such factors. Further, in some embodiments, the protection substrate 312 can be configured with surface structures, irregularities, incongruities and/or variations, such as but not limited to depressions, apertures, protrusions, bumps, spikes, pyramids, grooves, ridges, indentations, projections, roughening and/or other surface structures, irregularities or combinations of such surface structures and/or irregularities.

In some tests, the protection substrate 312 was fabricated from a thin sheet of material, cut to shape, and then taped or glued to the end of the conduit 314. In some cases it may be desirable to form a protection substrate that provides 360 degree coverage except where the hole being drilled enters the cavity. In that case, both the air and the water could enter at appropriately placed slots connected to the conduits through a rotatable collar.

Figure 5:
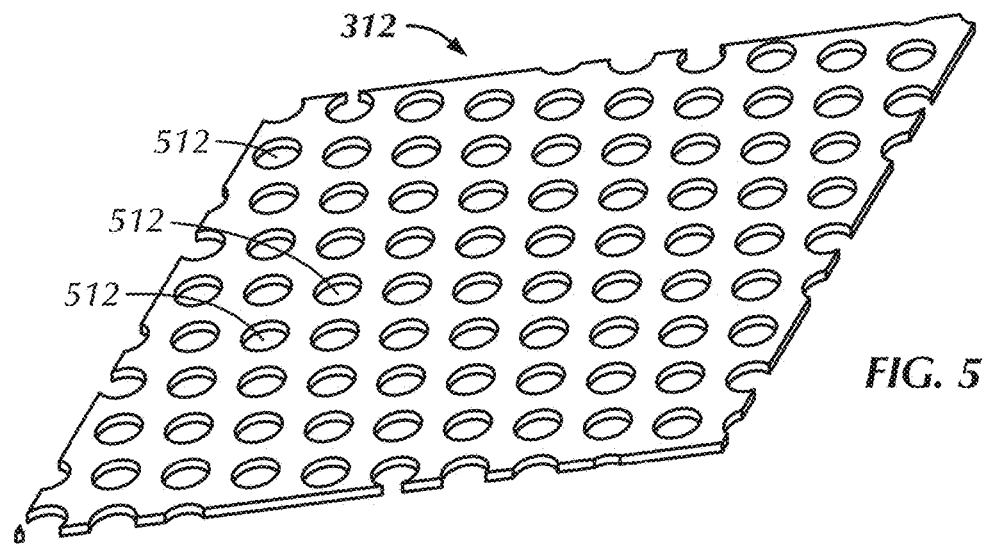
FIG. 5 depicts a simplified perspective view of a protection substrate according to some embodiments.

FIG. 5 depicts a simplified perspective view of a protection substrate 312 according to some embodiments. The protection substrate 312 can be configured with a plurality of apertures 512, recesses, or other such surface structures. In some embodiments, the protection substrate 312 comprises a grid or matrix of apertures 512 with the apertures extending through the protection substrate. The protection substrate 312 can be constructed from numerous materials or combinations of materials. For example, in some embodiments, the protection substrate can be constructed of the same material and/or cut from the fluid conduit 314. Additionally or alternatively, the protection substrate 312 can be made from Inconel®, copper, nickel, steel, carbon, ceramic, silver, refractory metals, tungsten carbide, or other such materials or combinations of such materials. Further, in some instances the material used is selected to be at least partially reflective, polished to be reflective and/or the surface upon which the laser pulse impinges can be coated with a reflective material.

As described above, the dimensions of the protection substrate 312 can depend on the laser machining expected to be performed, the amount and/or type of fluid supplied into the cavity 118 of the object 320 being machined, the expected diameter or dimensions 424 and/or cross-sectional area of the laser pulses, the type, intensity and/or power of the laser pluses applied in machining, predicted duration of exposure to the laser pulses, and other such factors.

For example, some successful test results to date have been obtained by following, at least in part, four design principles. First, the protection substrate is located such that it is as far away from the laser focus as possible. For example, when laser tooling a fuel injector the protection substrate 312 may benefit from being placed against the cavity wall opposite the hole being drilled (e.g., in some tests 1-3 mm away from the hole being drilled). This design principle may dictate that the protection substrate be shaped properly in order to be so located. In a case where there is sufficient distance available, then after a certain distance from the backwall placing the protection substrate further away yields little value.

Second, better results for at least some implementations have been obtained using a material (e.g., Inconel) that is inherently very strong and needs to reach a high temperature before softening. Although the exact mechanism responsible for this benefit is unclear, it is possible that strong materials are more resistant to erosion arising from the cavitation inherent in the interaction between the protection substrate and the fluid under the action of the laser pulses.

Third, when the grid 512 of tapered holes in the protection substrate is formed, some materials are easier to form the desired hole pattern into than others. The desired hole pattern for at least some implementations is one in which the holes taper gradually, not rapidly, and are typically packed as close together as possible. For cases where the protection substrate does not have a grid 512 of holes imposed on it this consideration is null.

Fourth, the protection substrate is selected to be thick enough so that there is a margin for ablation of the protection substrate itself. In some tests, the top hundred um of the protection substrate is ablated during the drilling of the first several holes in an injector, and subsequently exhibits a much slower rate of ablation. The exact mechanism underlying this behavior is not known but it may be related to "fine tuning" the angles of incidence that the incoming laser experiences when it encounters the protection substrate. In some experiments, 300 um thickness was selected.

Other design principles can additionally or alternatively be taken into consideration. For example, some embodiments are configured to direct the fluid at the protection substrate such that the fluid enters the apertures of the substrate. Additionally, the fluid may be directed at the substrate at such an angle and with sufficient force to ensure that fluid enters a majority of the apertures to one or more predefined fill levels.

Figure 6:
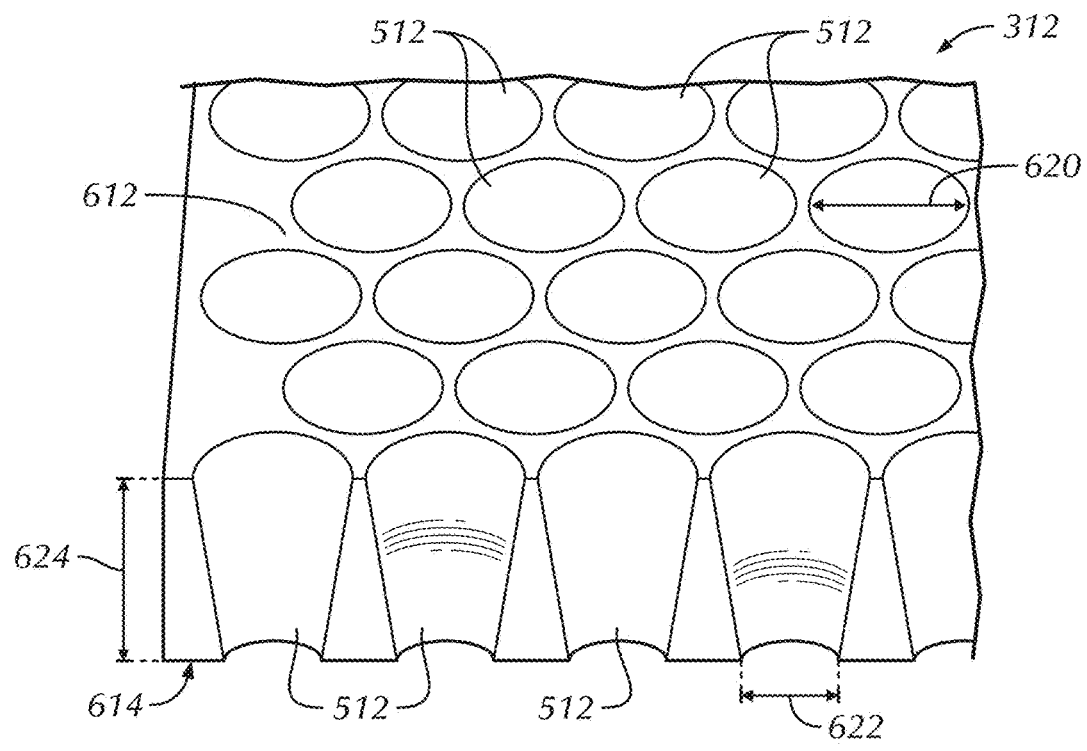
FIG. 6 depicts a simplified partial cut-away view of a protection substrate according to some embodiments.

FIG. 6 depicts a simplified partial cut-away view of a protection substrate 312 according to some embodiments. The protection substrate 312 can include the plurality of apertures 512 that extend through the thickness of the protection substrate from a first surface 612 to the second surface 614. In some embodiments, the wall of the apertures 512 taper between the first surface 612 and the second surface 614 and/or are generally conical shaped.

The inclusion of the apertures 512 and the tapered configuration both provide an increased surface area upon which the laser pulse is incident. As such, the laser pulse is distributed over the increased surface area that diffuses the laser energy while providing increased heat dissipation. This diffusion of the laser energy is in addition to that provided, in some embodiments, by positioning the protection substrate 312 at an angle 416 relative to the laser pulse. Additionally, as the fluid supplied through the fluid conduit 314 contacts the protection substrate 312 the fluid can partially and/or fully fill some or all of the apertures 512 providing increased amounts of fluid at the areas where the laser pulse impinges, which can provide further heat dissipation and can additionally aid in controlling plasma production surface degradation of the protection substrate 312. The fluid typically restricts the expansion of plasma formed at the surface thereby helping to reduce the increase in local laser absorption that would accompany the longer gradients of protection substrate material that might otherwise exist. This increase in laser absorption typically results in increased ablation of the protection substrate. Further, the extension of the apertures 512 through the protection substrate 312 provides an additional outlet for liquid and/or gases as the laser pulse impinges upon the fluids in contact with the protection substrate 312.

The apertures 512 can be positioned in various arrangements. In some instances, the apertures are positioned in a hexagonal configuration and closely packed. In some implementations, the apertures may be positioned in other configurations and/or the sizes or diameters of the apertures 512 may be varied. Further, in some instances, the apertures 512 are laser drilled into the protection substrate 312 to achieve the desired density, positioning and/or aperture shape or configuration. In some embodiments, the shape of the apertures may vary, such as between apertures, between regions of the protection substrate 312 or other such configurations. In some examples, the protection substrate is configured with apertures 512 having approximately a 20-50 micron diameter 620 at the first surface 612 upon which the laser is intended to impinge. The apertures taper to about 5 to 10 micron diameter 622 at the second surface 614 along a depth 624 of about 200-400 microns. These apertures are spaced to within a few um of each other at the surface upon which the laser is intended to impinge. Some tests performed utilized a protection substrate with aperture entrances of about 18-27 um and an exit of about 5-10 um before use in drilling. Holes with larger or smaller sizes are possible. During use and as the top 100 um or so of the protection substrate are ablated away by the laser the apertures shrink to maybe 10-15 um and the spacing increases to about 10 um or so, that spacing is difficult to define because the surfaces can become more angled with respect to the original surface of the substrate.

Figure 7:
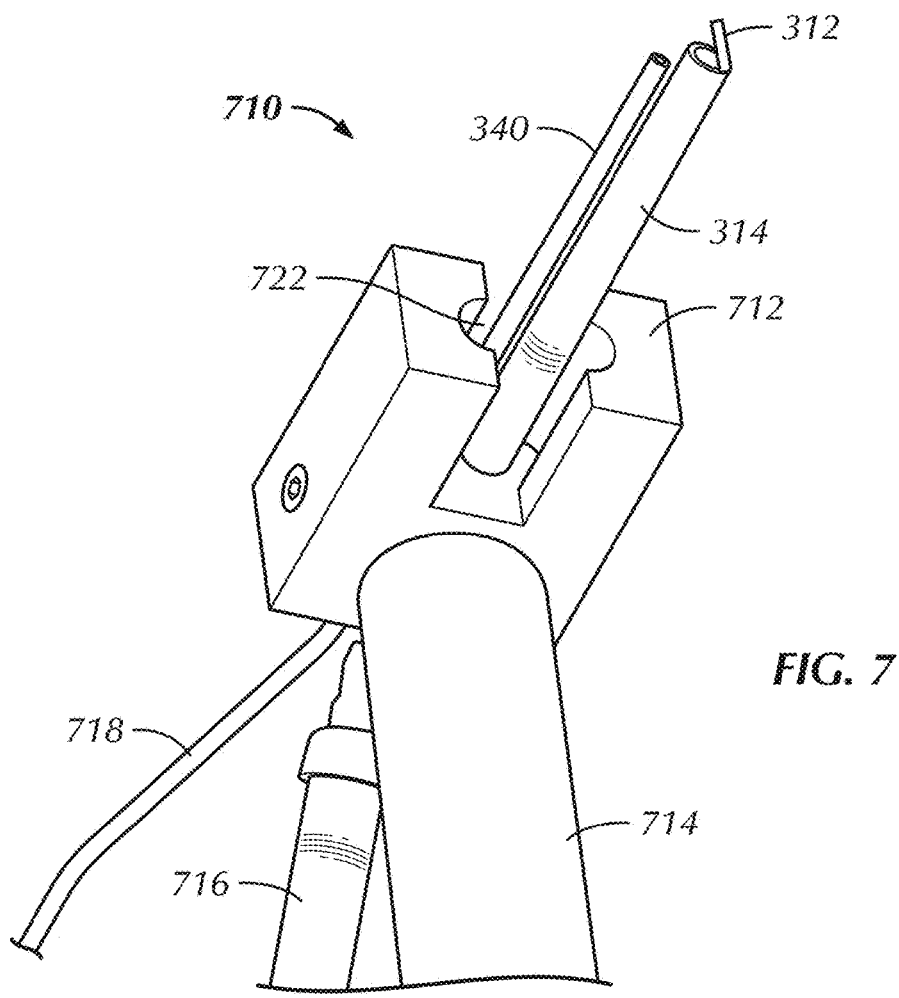
FIG. 7 depicts a simplified perspective view of a protection system according to some embodiments.

FIG. 7 depicts a simplified perspective view of a protection system 710 according to some embodiments. The protection system 710 includes the protection substrate 312 cooperated with the fluid conduit 314, the gas conduit 340, a positioning holder 712, a positioning arm 714, a fluid supply line 716 and a gas supply line 718. The fluid conduit 314 and the gas conduit 340 are cooperated with the positioning holder 712 to maintain a positioning of the protection substrate 312, fluid conduit 314 and gas conduit 340.

Further, the fluid supply line 716 and the gas supply line 718 are cooperated with the positioning holder 712 to supply fluid and gas to the fluid conduit 314 and the gas conduit 340, respectively. The positioning arm 714 is fixed with the positioning holder 712, e.g., threaded, bolted, welded, pinned, screwed, or the like, or combinations thereof. The positioning arm 714, in some embodiments, is further cooperated with one or more gears, motors or the like to position the positioning holder 712 relative to the object 320 being laser machined and position the protection substrate 312 within a cavity 318 of the object 320 and/or within the path of the laser pulses. In other embodiments, the object 320 is alternatively or additionally moved relative to the protection system 310. In some embodiments, the positioning holder 712 is further configured to cooperate with the object 320 being laser machined. For example, the positioning holder 712 can include one or more alignment apertures 722, shoulders, slots or the like that are configured to cooperate with and/or aid in positioning an object 320 to be laser machined relative to the protection system 310 and the protection substrate 312. For example, when the object 320 is a fuel injector, the positioning holder 712 can be configured to mate with the fuel injector such that the fuel injector or a portion of the fuel injector extends down into the alignment aperture 722 and/or extends around and mates with the exterior of the positioning holder 712.

The fluid conduit 314 and the gas conduit 340 are sized and cooperated with the positioning holder 712 to allow the protection substrate 312, the fluid conduit 314 and the gas conduit 340 to be positioned at least partially within a cavity 318 of an object 320 being laser machined and at a desired location to allow the protection substrate 312 to be in the laser path as well as the gas conduit 340 to direct the gas flow along an interior surface of the cavity 318 proximate the laser machined hole 330. Accordingly, in some instances, the dimensions of the protection substrates 312, fluid conduit 314 and/or gas conduit 340 are least partially defined by the object 320 to be laser machined.

Figure 8:
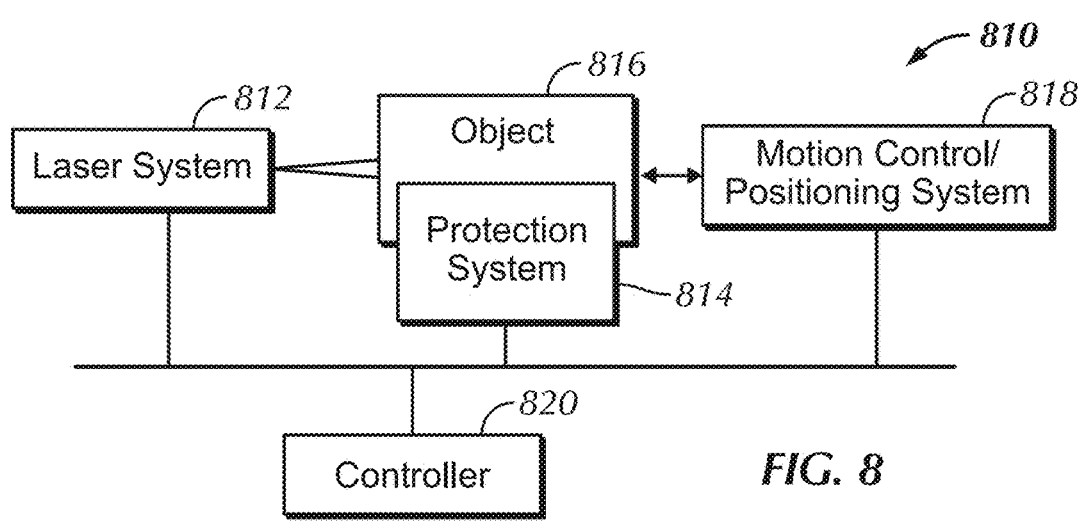
FIG. 8 depicts a simplified block diagram of a laser machining system according to some embodiments.

FIG. 8 depicts a simplified block diagram of a laser machining system 810 according to some embodiments. The laser machining system 810 includes a laser system 812, a protection system 814 that cooperates with the object 816 to be laser machined, a motion control and/or positioning system 818 (referred to below as the positioning system), and a controller 820.

The controller 820 can be configured as a single device or separate devices, such as one or more controllers, which can include one or more controllers in the laser system 812, protection system 814, positioning system 818 and/or an overall controller. In some embodiments, the controller 820 comprises one or more processors and/or microprocessors coupled with memory that stores code, instructions and/or software for controlling the laser machining system 810. In some implementations, the controller 820 can be at least partially implemented through a computer coupled with one or more of the laser system 812, the protection system 814 and the positioning system 818.

The laser system 812 generates the laser pulses and directs the laser pulses to accurately impact the object 816 to be laser machined at the desired location on the object 816. Typically, the laser system 812 includes optics, slicers, pickers and the like to focus and direct the laser pulse to impinge upon the object 816. In some embodiments, the laser system 812 includes additional elements and/or features, such as delay paths and the like to produce one or more laser pulse to impinge upon the object 816 to achieve the desired laser machining.

The protection system 814 cooperates with the controller 820 and the object 816 to provide backwall protection to the portion of the object opposite the hole or other machining being generated. In some embodiments, the protection system 814 supplies a fluid into a cavity of the object 816 such that the fluid provides protection to for the backwall of the object 816 opposite the portion of the object being laser machined. The protection system 814, in some embodiments, further includes a backwall protection device (not shown in FIG. 8) that is inserted into the cavity between the portion of the object 816 being laser machined and the backwall opposite that portion of the object being laser machined. For example, the backwall protection device can comprise the protection system 710 of FIG. 7. In other embodiments, the backwall protection device can comprise a mesh structure (e.g., column, tube, cubic structure, etc.), a porous structure or other relevant structure that can be positioned between the hole being machined in the object 816 and the backwall. The protection system 814 can include additional or alternative components, such as but not limited to a gas source and distribution device, a fluid source coupled with the fluid conduit 314, one or more flow meters for the fluid(s) and/or gas(es), pressure regulators, and/or other such components.

The positioning system 818 can cooperate with the laser system 812, the protection system 814 and/or the object 816 to position the components of the laser machining system 810 to accurately laser machine the object 816 while providing backwall protection. The positioning system can include one or more motors, gears, pumps, pistons, hydraulics, cables, end effectors, pincers, and/or other such devices to position components relative to each other. For example, in some implementations, the positioning system 818 is cooperated with the object 816 to control the positioning and/or maintaining the positioning of the object during laser machining and/or to reposition the object to perform further laser machining (e.g., reposition the object to laser drill multiple holes into the object 816). In other embodiments, the positioning system 818 can additionally or alternatively be cooperated with the protection system 814 to position at least a portion of the protection system to accurately apply fluid into the cavity, to position a protection substrate 312 within the cavity and/or to position one or more gas sources relative to the surface being laser machined. Similarly, in some embodiments, the positioning system may in part provide some control over positioning of the laser system 812 or portions of the laser system to accurately focus and direct the laser pulse onto the object 816.

Figure 9:
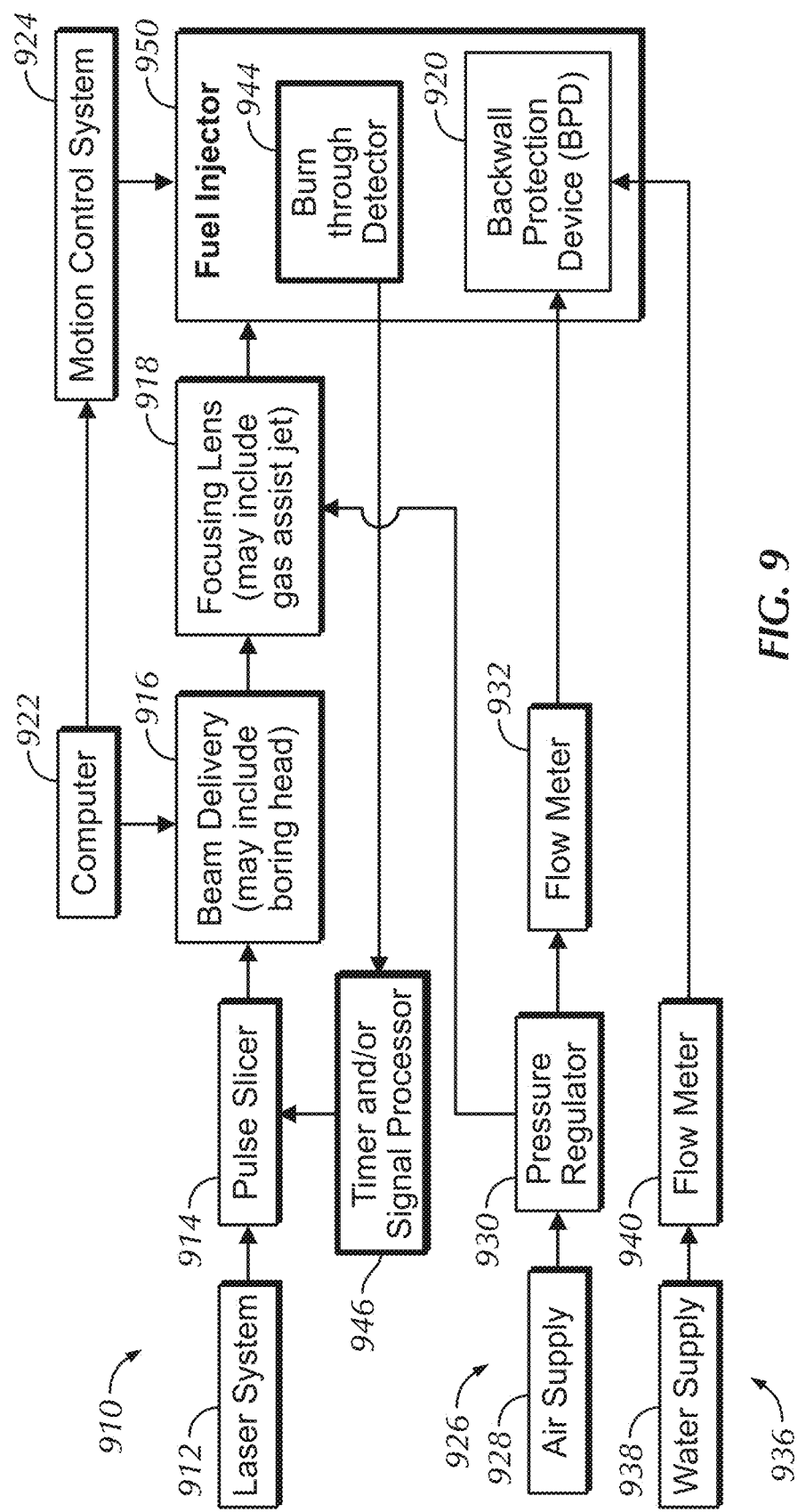
FIG. 9 depicts a simplified block diagram representation of a laser machining system according to some embodiments.

FIG. 9 depicts a simplified block diagram representation of a laser machining system 910 according to some embodiments. The laser machining system 910 includes a laser system 912, one or more pulse slicers 914 and/or pulse pickers, a beam delivery system 916, an optics system 918, a protection system 920, a controller 922, a positioning system 924, gas supply system 926 comprising a gas supply 928, a pressure regulator 930 and in some instances one or more flow meters 832, and a fluid supply system 936 comprising a fluid supply 938 and one or more flow meters 940. The laser machining system 910 can in some instances further include one or more sensors 944 and a timer and signal processor 946.

The laser system 912 includes one or more laser generators that generate relevant laser pulses to perform the laser machining. The pulse slicer 914 is cooperated with the laser system 912 and directs desired numbers of pulses in accordance with desired pulse timing and/or pulse rate at the object 950, which is typically a predefined time period. The beam delivery system 916 directs the one or more pluses toward the object 950, and can include optics such as but not limited to shutter, telescope, boring head, mirrors and the like. The optics system 918 typically includes one or more focusing lenses to precisely focus the laser pulses onto the object 950. There may, in at least some embodiments, include two other equipment-related details of consideration here. First, a process control shutter can be used, in some embodiments, to regulate the overall drilling time. Second, a pulse slicer may be used to reduce the firing rates of the lasers from about 10,000 shots per second to about 1000-2000 shots per second when desired. A different lasers system may be able to achieve the desired firing rates without any external pulse selecting devices.

The protection system 920 is positioned relative to the object 950 and/or the object is positioned relative to the protection system (e.g., through the positioning system 924) so that the protection system 920 can at least deliver the appropriate fluid into the cavity of the object 950 as delivered from the fluid supply system 936, and when relevant can deliver the gas as supplied by the gas supply system 926. In some instances, the protection system 920 and/or the gas supply system 926 supplies a stream of gas (e.g., air, oxygen, etc.) within the cavity proximate the site of laser machining. Additionally or alternatively, some embodiments provide a stream of gas along an exterior of the object 950 at the site of the laser machining. Further, in some instances the protection system 920 includes the protection substrate 312 that is positioned within the cavity and in alignment with laser pulses during laser machining. In many embodiments, the stream of gas along the exterior is generally coaxial with the laser; hence it is more perpendicular to the surface of the object being tooled than parallel.

The controller 922 can be implemented through one or more computers and/or processors coupled with or as part of the various components of the laser machining system 910. For example, the controller 922 controls the gas supply 928 and/or pressure regulator 930 based on feedback information provided by the flow meter 932; controls the fluid supply 938 based on feedback received from the fluid flow meter 940. Similarly, in some embodiments, the controller 922 can provide at least some control over the positioning system 924 that can control a relative position of the object 950, the protection system 920, the laser system 912, the pulse slicer 914 and/or other components or sub-components of the laser machining system 910. For example, in some instances, the positioning system 924 can position an object 950 so that a first hole can be laser drilled through the object 950 while the backwall is protected, and following the laser drilling of the first hole the object 950 may be repositioned, such as rotated to align another portion of the object 950 with the laser system so that a second hole can be laser drilled. Depending on the intended laser machining of the object 950, the laser system 912, object 950 and/or the protection system 920 can be positioned any number of times while multiple holes are laser drilled or other laser machining are preformed on the object 950.

Additionally, in some implementations, the controller 922 can at least in part provide control over the gas supply system 926 and/or the fluid supply system 936. For example, the controller 922 can receive flow meter data from the one or more flow meters 932, 940 and use this information to control the pressure and/or flow of gas and/or fluid that is delivered to the protection system 920. As introduced above, in some instances, the gas supply system 926 may direct a stream of gas across an interior surface the cavity of the object 950 while laser machining is being performed, which can aid in limiting liquid from entering the hole or other machined area generated in the object 950 during laser machining. Similarly, a stream of gas can be directed across an exterior of the object 950 proximate the area being laser machined, which can remove debris and spatterings from the area being machined and also help reduce or eliminate the amount of water or other fluids from entering the hole being drilled. This external gas jet has in at least some tests been deployed coaxially with the laser beam. Still further, in some instances, the optics system 918 may include a gas assist jet and accordingly a pressure regulator 930 can be utilized to control the amount of gas supplied.

The one or more sensors 944 can be provided in some instances to detect and/or monitor various parameters. For example, in some implementations, a burn through detector can be incorporated with the protection system 920 and/or positioned relative to the cavity separate from the protection system 920. The burn through detector can detect when a laser pulse penetrates the wall of the object 950 and enters the cavity. This detection can be used in controlling the laser machining, such as by adjusting durations of laser pulses, adjusting durations between laser pulses, adjusting durations between laser bursts, adjusting an intensity of laser pulses, adjusting the laser wavelength, beam shaping, trepanning, gas assists and/or other such adjustments or combinations of such adjustments.

For example, in some instances a burn through detector is utilized in cooperation with controlling the laser pulses. Once the laser pulses generate a hole through the wall of the object it is typically preferred to continue laser drilling or machining to achieve the desired quality of the laser drilled hole. Accordingly, at least some of each laser pulse directed at the object 950 after a hole is generated pass through the hole and impinge upon the protection substrate 312 of the protection system 920. Further, some embodiments reduce the pulse rate, which increases the duration between pulses or bursts of pulses. The increased duration between pulses or bursts can reduce adverse affects on the protection substrate and/or the backwall. Until the hole is generated in the object 950, however, it can be desirable to increase the pulse rate and accordingly increase the machining rate. So a burn through detector can be used to detect the initial generation of a hole in the object 950. The sensor can notify a signal processor 946 or directly notify the pulse slicer 914 and/or controller 922 to control the pulse rate, such as reducing the pulse rate that are directed at the object 950. The reduced rate can depend on many factors, such as but not limited to the object 950 being machined, the material of the object being machined, the protection substrate 312 when used, the liquid flow rate, expected cavitation rate, laser intensity, dimensions of the cavity, and/or other such factors or combinations of such factors. The burn through detector or sensor 944 can be implemented, in some embodiments, through one or more photodiodes, which may be positioned within the cavity or external to the cavity. Additionally, some embodiments further include a fiber optic that is optically cooperated with one or more photodiodes, where the end of the fiber optic distant from the photodiode can be positioned within the cavity of the object 950, such as being cooperated with the fluid conduit 314 or gas conduit 340.

Additionally or alternatively, a timer 946 can be utilized to anticipate the laser burn through. Typically, the time needed to achieve the desired burn through is approximately known. As such, the timer 946 can be used to anticipate burn through so that the pulse rate can be adjusted to provide further protection to the backwall while still allowing rapid laser drilling.

Figure 10A:
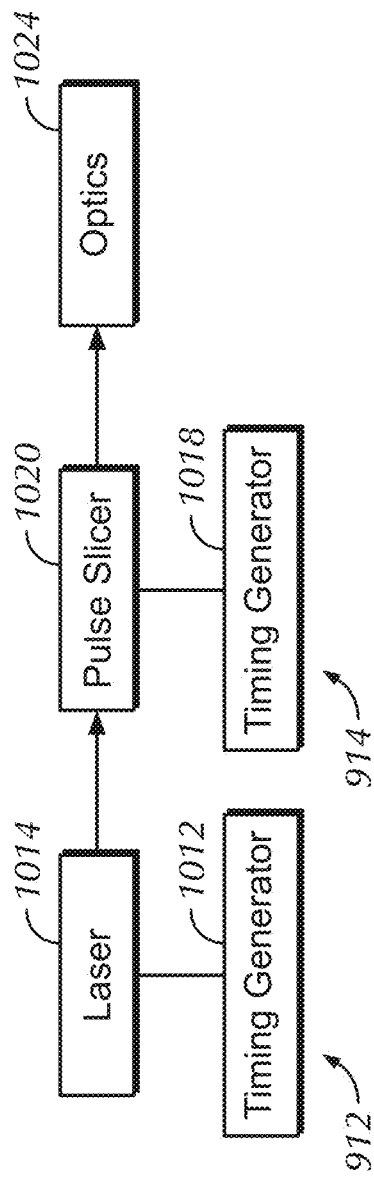
FIG. 10A depicts a simplified block diagram showing an example implementation of the laser system and pulse slicer of FIG. 9 in accordance with some embodiments.

FIG. 10A depicts a simplified block diagram showing an example implementation of the laser system 912 and pulse slicer 914 of FIG. 9 in accordance with some embodiments. The laser system 912 can include a timing generator 1012 cooperated with a laser 1014. The pulse slicer 914 can include a second timing generator 1018 and a pulse slicer 1020. Some embodiments include optics 1024 to direct the laser pulses along an intended path, which can be directed to the beam delivery system 916.

Figure 10B:
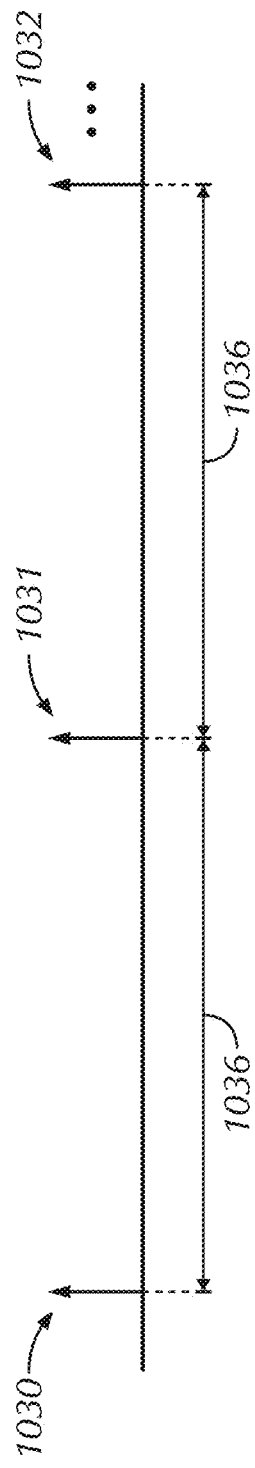
FIG. 10B depicts a simplified timing diagram representative of laser pulse timing used in performing laser machining in accordance with some embodiments.

FIG. 10B depicts a simplified timing diagram representative of laser pulse timing used in performing laser machining in accordance with some embodiments. Laser pulses 1030-1032 are generated and directed at the object 950. The pulses 1030-1032 are separated by a duration 1036. For example, the duration 1036 can be approximately 0.5 ms. Additionally, in some implementations, each laser pulse has a pulse duration within a range of between approximately 10 ps and 100 ns. The backwall protection provided by the present embodiments, however, is not limited to these laser pulses and/or timing. Alternatively, the backwall protection can be utilized with substantially any laser pulses, laser pulse durations and/or durations between pulses or bursts of pulses. For example, some embodiments provide backwall protection for double pulse with 5 ps pulses, or single pulse machining with 100 fs laser pulses. In some instances, the duration 1036 may vary over time based on predefined machining schedule, such as upon detection that the laser pulses have broken through the wall of the object 950 being machined, a predicted amount of time or other such factors.

Referring to FIGS. 10A-B, the timing generator 1012 can in part arrange the pulses, with the second timing generator 1018 providing timing to coordinate the pulse slicer 1020 to accurately direct the pulses 1030-1032 according to defined pulse rates to achieve the relative timing between pulses. The optics 1024 can include relevant optics to aim the laser pulses, and can include, but is not limited to, one or more waveplates, polarizers and the like.

Figure 10C:
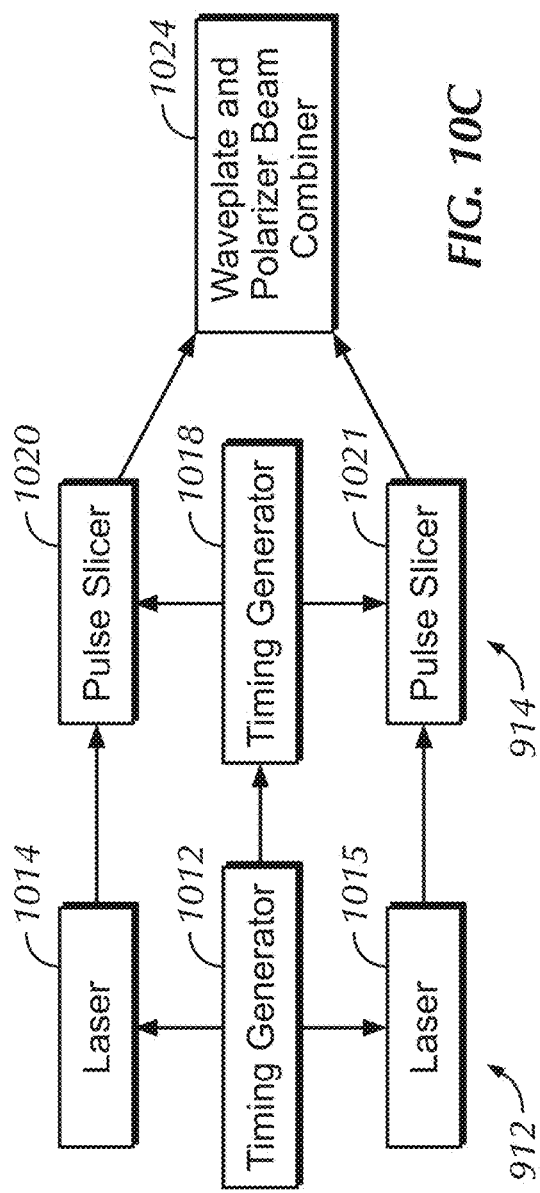
FIG. 10C depicts a simplified block diagram showing an example implementation of the laser system and pulse slicer of FIG. 9 in accordance with some embodiments.

FIG. 10C depicts a simplified block diagram showing an example implementation of the laser system 912 and pulse slicer 914 of FIG. 9 in accordance with some embodiments. The laser system 912 can include a first timing generator 1012 cooperated with two lasers 1014-1015. The pulse slicer 914 can include a second timing generator 1018 and first and second pulse slicers 1020-1021. Some embodiments include optics 1024 to combine or otherwise direct the laser pulses along a single path, which can be directed to the beam delivery system 916, which can include optics and the like.

Figure 10D:
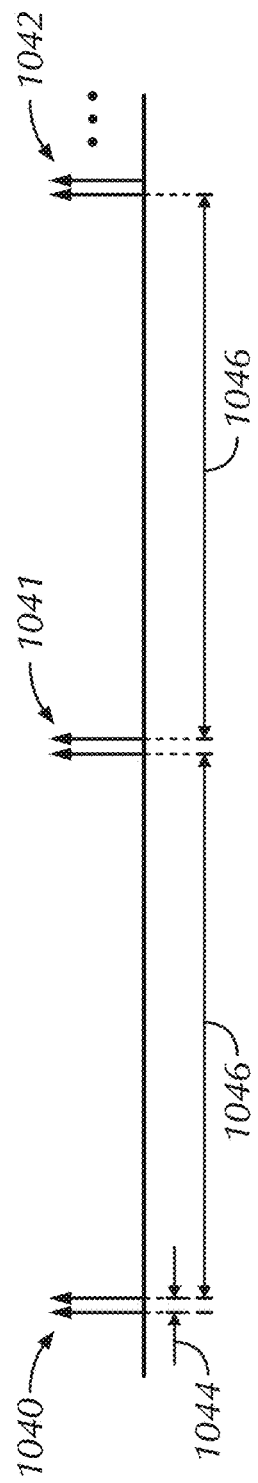
FIG. 10D depicts a simplified timing diagram representative of laser pulse timing used in performing laser machining in accordance with some embodiments.

As described above and further below, in some embodiments, the laser pulses may be generated in bursts. FIG. 10D depicts a simplified timing diagram representative of laser pulse timing used in performing laser machining in accordance with some embodiments. Laser bursts 1040-1042 are generated and directed at the object 950. The bursts 1040-1042 include multiple laser pulses, which in some instances can enhance laser drilling and/or laser machining. For example, the laser bursts can be formed and/or used similar to that described in U.S. Pat. No. 6,664,498, which is incorporated herein by reference in its entirety. Other methods can be used in generating the multiple pulses of the bursts 1040-1042, such as but not limited to pulse picking a high repetition rate train and amplifying that, causing a picosecond regenerative amplifier to run at a desired right state of misalignment, and/or other such methods.

The pulses of a burst 1040-1042 are separated by a first duration 1044, and sequential bursts 1040-1042 are separated by a second duration 1046. In one example, the first duration 1044 is approximately 50-200 ns, with the second duration 1046 being about 0.5 ms. Additionally, in some implementations, each laser pulse has a pulse duration within a range of between approximately 10 ps and 100 ns. A time between each laser pulse of each burst can be within a range of between approximately 5 ns and 5 µs. Further, a time between successive bursts is greater than the time between each laser pulse comprising each burst, wherein an intensity of the first laser pulse and/or second laser pulse of each burst exceeds a damage threshold of the object being machined. The time between bursts 202 is determined by the pulse repetition rate of the laser which can range from a few Hertz to approximately 100 kilohertz; however, the time between bursts 202 is substantially greater than the time between the pulses 204, 206 within each burst 202 (e.g., greater than 10 times, or greater than 100 times, or greater than 1000 times the time duration between the pulses 204, 206). Again, however, the backwall protection provided by the present embodiments can be used with substantially any laser pulses, pulse durations, durations between pulses and/or durations between bursts of pulses while considering the bubble formation, collapse and/or dispersion.

In FIG. 10C the bursts 1040-1042 are each separated by the single second duration 1046. As described above, however, the first duration 1044 and/or the second duration 1046 may vary over time, such as based on predefined machining schedule, such as upon detection that the laser pulses have broken through the wall of the object 950 being machined, a predicted amount of time or other such factors. In other embodiments, the laser machining is performed with single pulses instead of or in cooperation with the multi-pulse bursts.

Referring to FIGS. 10C-D, the first timing generator 1012 can in part arrange the pulses of a burst 1040, such as double pulse bursts with each pulse generated from one of the first and second lasers 1014-1015. The second timing generator 1018 provides timing to coordinate the first and second pulse slicers 1020-1021 to accurately direct bursts 1040-1042 of the two laser pulses according to defined pulse rates to achieve the relative timing between bursts. The optics 1024 can include relevant optics to combine the laser pulses, such as but not limited to one or more waveplates, polarizers and the like. In other embodiments, a single laser 1014 is used and the laser beam is split to generate the second pulse with a delay incorporated in the path to achieve the desired duration 1034 between pulses of the bursts.

Figure 11:
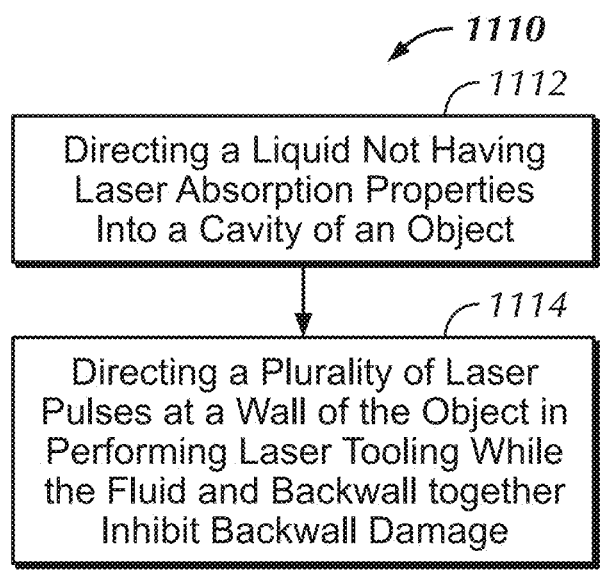
FIG. 11 depicts a simplified flow diagram of a process of laser machining while providing backwall protection, according to some embodiments.

FIG. 11 depicts a simplified flow diagram of a process 1110 of laser machining while providing backwall protection, according to some embodiments. In step 1112, a fluid is directed into a cavity of an object 950 being laser machined. Typically, the fluid directed into the cavity does not have laser absorption or dispersion properties at the wavelengths of the laser pulses. Similarly, the fluid is typically substantially free of laser-barrier properties. In step 1114, a plurality of laser pulses are directed at a wall of the object 950 being laser machined. The laser pulses are configured to form a hole through the wall of the object 950 such that laser pulse passes through the hole and enters the cavity while the fluid is directed into the cavity such that the laser pulse is incident on the fluid and a surface together in order to inhibit backwall damage.

Figure 12:
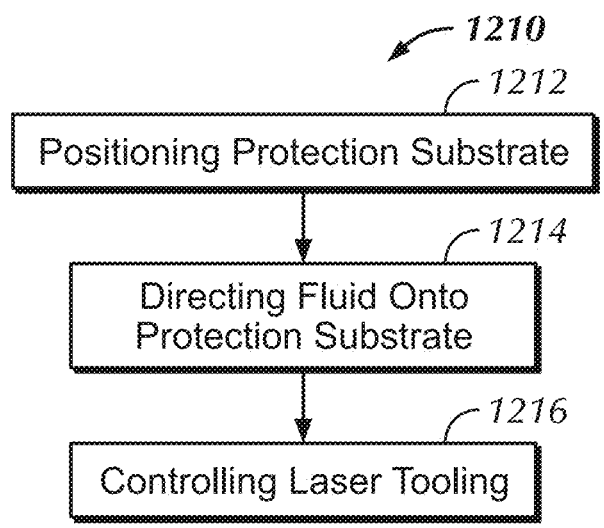
FIG. 12 depicts a simplified flow diagram of a process of laser machining while protecting a backwall surface of an object being laser machined, according to some embodiments.

FIG. 12 depicts a simplified flow diagram of a process 1210 of laser machining while protecting a backwall surface of an object 950 being laser machined, according to some embodiments. In step 1212, a protection substrate (e.g., protection substrate 312) is positioned within a cavity of the object 950 so that the protection substrate is aligned with the predicted laser path and an intended hole or other laser machining to be performed on a wall of the object 950.

In step 1214, a fluid is directed into the cavity and onto the protection substrate 312. In many embodiments, the fluid does not include laser absorption properties, and further, may simply be water (e.g., tap water, chilled water, super-cooled water, etc.), alcohol, liquid gas (e.g., liquid nitrogen) or other relevant fluids that can transmit the laser light and in at least some instances boil so that they take the energy of the laser away. In some instances, a surfactant may be included with the fluid to help wet the protection substrate better. Additionally, the fluid typically does not leave a residue that has to be removed through additional or complex procedures. Further, the fluid can be directed to directly contact the surface of the protection substrate 312 upon which the laser pulses are to impinge. In step 1216, laser machining is controlled to generate the hole or other laser machining into the wall of the object 950. With the protection substrate 312 accurately positioned, the laser pulses that penetrate the wall of the object 950 and enter the cavity are incident upon the protection substrate 312 and the fluid directed onto the protection substrate such that the protection substrate inhibits the laser pulse from impinging on the backwall surface across the cavity from the hole being laser machined.

Figure 13:
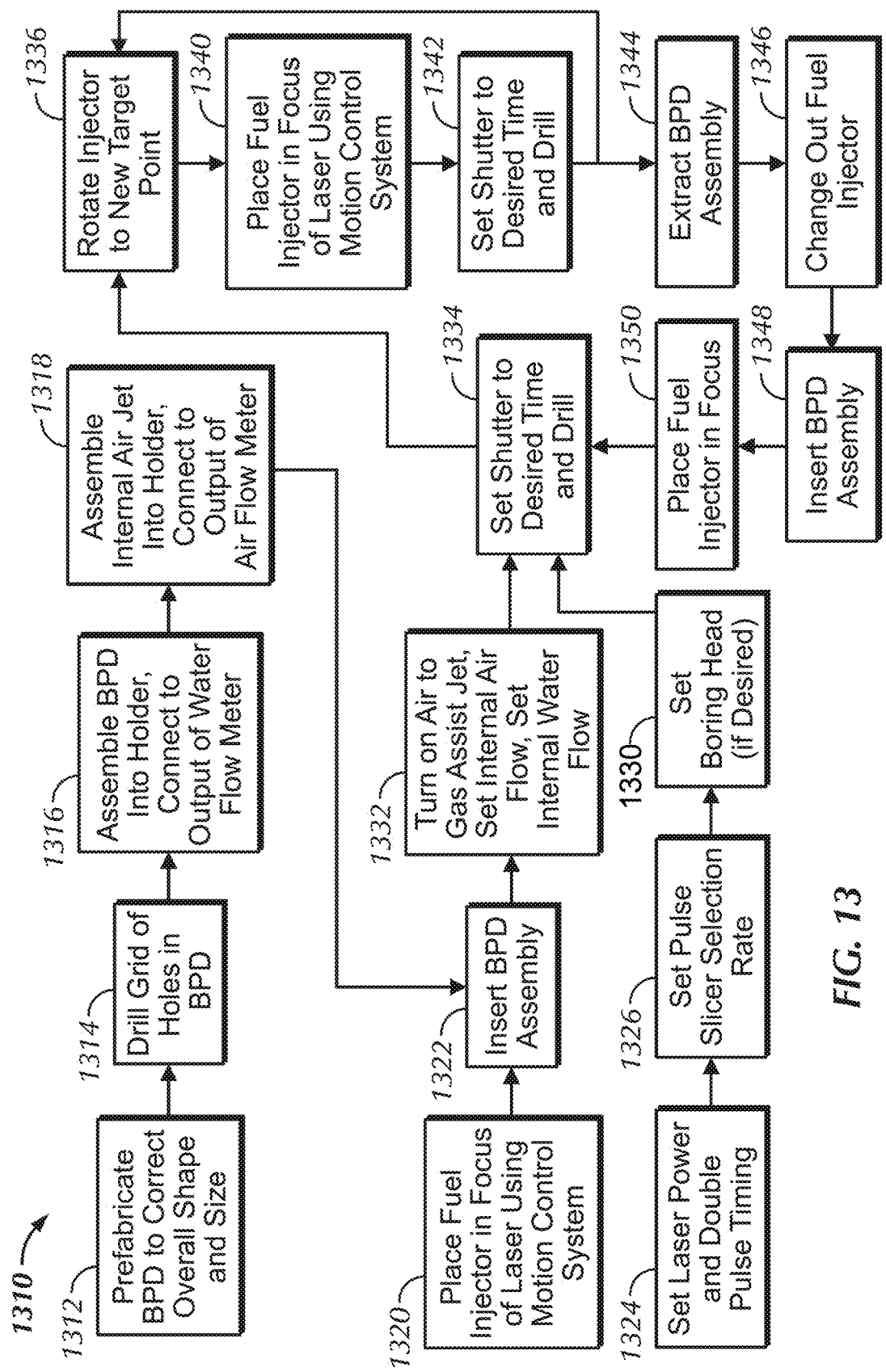
FIG. 13 depicts a simplified flow diagram of a process of laser machining an object in accordance with some embodiments.

FIG. 13 depicts a simplified flow diagram of a process 1310 of laser machining an object 950 in accordance with some embodiments. For example, the process 1310 can be used in laser drilling a plurality of holes into fuel injectors proximate a narrow tip of the fuel injector through which fuel is intended to be ejected when the fuel injector is utilized within an engine. In step 1312, a protection substrate 312 is configured and/or constructed according to predefined size and shape, which is dependent on the object 950 being laser machined (e.g., a fuel injector), the size of the object, the size of the cavity, the space available to access the cavity and other such relevant factors. Additionally, in some instances, the dimensions of the protection substrate 312 can depend on the intended laser machining, the intended intensity of the laser pulses, duration of laser pulses, duration between pulses, duration between laser bursts when bursts are employed, the support (e.g., fluid conduit 314) for the protection substrate 312 when positioned within the cavity and the coupling of the protection substrate with the fluid conduit 314, and other such factors. For example, in some embodiments, the protection substrate is formed by machining the fluid conduit 314 to cut out the protection substrate 312 directly from the fluid conduit. The protection substrate 312, in some instances, can be bent relative to an axis of the fluid conduit 314 to allow the surface of the protection substrate to be positioned within the cavity at a desired angle relative to the path of the laser pulses and/or such that the fluid released from the fluid conduit 314 is at least partially directed onto the protection substrate 312.

In step 1314, one or more surface structures, such as apertures, and/or irregularities are formed in the protection substrate 312. For example, in some embodiments, a grid or matrix of apertures 512 are machined, laser drilled or otherwise formed in the protection substrate. For example, the grid of apertures and/or depressions may be formed in a hexagonally close packed configuration with a cross-section of the apertures and/or depressions being tapered. In step 1316, the protection substrate 312 is support by the fluid conduit 314, which is cooperated with the positioning holder 712, The fluid conduit 314 is further cooperated with an output of the fluid supply system 936 (e.g., coupled to an output of a flow meter 940). In step 1318, the gas conduit 340 is assembled with the positioning holder 712, and connected to the output of the gas supply system 926 (e.g., an output of a flow meter 932).

In step 1320, an object 950 to be laser machined (e.g., a fuel injector) is positioned so that a portion of the object to be laser machined will be proximate the focus of the laser when activated. In some embodiments, the positioning system 924 can position the object 950 at the desired location. It is noted that the object 950 to be laser machined and/or the laser do not have to be positioned such that the laser focus 218 is directly at a center of a hole or other gap to be laser machined. In fact, in some instances it may be beneficial and desired for the focal point not to be positioned at a center of a hole being formed. For example, the laser focus 218 may be directed to be on center radially of a hole to be formed but not axially. In other instances the focus 218 may be positioned outside the object 950. Similarly, in some instances, such as when a boring head is being used, the laser can be moved, for example, to precess around a circumference of a hole or gap being tooled. In step 1322, the protection system 310 is positioned within the cavity of the object 950 such that the protection substrate 312 is in alignment with the intended path of the laser pulses.

In step 1324, laser parameters are set for the laser system 912, such as laser power, pulse timing (e.g., double pulse timing) and other such relevant parameters. In step 1326, the one or more pulse slicers 914 are configures to set a selection rate. In some embodiments, steps 1324 and 1326 are configured according to a machining plan, which may include varying over time one or more of the laser parameters and/or the selection rates during the laser machining, such as based on timing of expected burn through and/or in response to detecting burn through. In step 1330, the beam delivery system 916 is configured, such as setting a boring head when desired.

In step 1332, the fluid supply system 936 and gas supply system 926 are configured to set the gas and fluid flow rates and activated to initiate the supply of fluid and gas to the interior of the cavity of the object 950. In some embodiments, a gas is further delivered to a gas assist jet when relevant, such that a stream of gas is directed along an exterior of the object 950. In step 1334, the one or more shutters are set to desired timing and laser drilling is activated to drill a first hole in the object 950.

In some embodiments, multiple holes or other laser machining may be performed on the object 950. For example, when the object is a fuel injector, typically multiple holes are laser drilled into the fuel injector. Accordingly, some embodiments include step 1336, where the object 950 is rotated or otherwise moved to a new target point on the object 950. In step 1340, the object 950 is positioned relevant to the focus of the laser. In some implementations, the rotation and positioning of the object 950 is implemented by the positioning system 924. In step 1342, the one or more shutters are set to the desired drill time and laser drilling is implemented. When further laser drilling and/or machining is to be performed the process 1310 can return to step 1336 to rotate or otherwise reposition the object 950 for subsequent laser drilling or machining.

When the laser drilling is complete the process continues to step 1344 where the protection system 310 is removed from the cavity. In step 1346, a subsequent object 950 is positioned relative to the laser system 912. In step 1348 the protection system 310 is inserted into the cavity. In step 1350, the subsequent object 950 is positioned relative to the laser focus. The process 1310 can then return to step 1334 to set the shutter timing and implement laser drilling.

Some embodiments provide backwall protection without inserting the protection substrate between the laser pulse and the backwall. In part, this protection scheme in implemented by supplying a fluid into the cavity of the object being laser machined while controlling the laser pulses and timing of the laser pulses during the laser machining.

Figure 14:
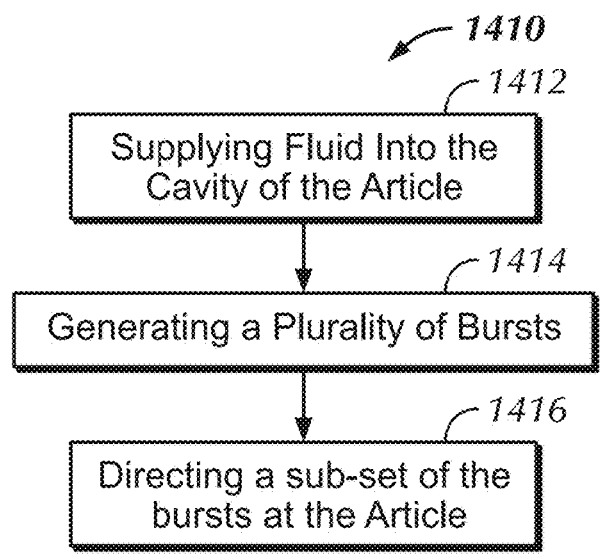
FIG. 14 depicts a simplified flow diagram of a process, in accordance with some embodiments, of protecting a backwall of an object during laser machining of that object.

FIG. 14 depicts a simplified flow diagram of a process 1410, in accordance with some embodiments, of protecting a backwall of an object 950 (e.g., a turbine blade, fuel injector or substantially any object) during laser machining of that object. In step 1412, a fluid supply system is activated to supply a fluid into a cavity of the object 950. Typically, the fluid supplied into the cavity does not have laser absorption or dispersion properties, and in many instances is simply water supplied into the cavity of the object 950. The fluid is in contact with the backwall being protected against damage, and in some instances substantially fills or fills the cavity of the object. In step 1414, a plurality of laser pulses and/or bursts are generated. Typically, the laser pulses are provided in bursts, with each burst including multiple laser pulses (e.g., two pulses) that are separated in time by only a small duration of time, at least relative to the duration of time between bursts. The generation of laser bursts and the use of laser bursts in laser machining are described in U.S. Pat. No. 6,664,498 to Forsman et al., which is incorporated herein by reference in its entirety.

In step 1416, the timing between laser pulses and/or bursts that impinge upon the object 950 are precisely controlled such that laser pulses are generally not incident upon the backwall while single or multiple bubbles are present at the backwall. Accordingly, the laser pulses are incident on the fluid and the backwall surface, with the fluid and the backwall surface together inhibiting backwall damage. In some instances the timing between laser pulses and/or bursts is controlled by selecting a sub-set of the laser bursts and directing the sub-set of the laser bursts at the object 950 in accordance with predefined timing so as to limit and/or prevent backwall damage with the aid of the fluid being in contact with the backwall. The predefined timing is dependent on the generation of bubbles and/or cavitation within the fluid as a result of the laser pulses.

Figure 15:
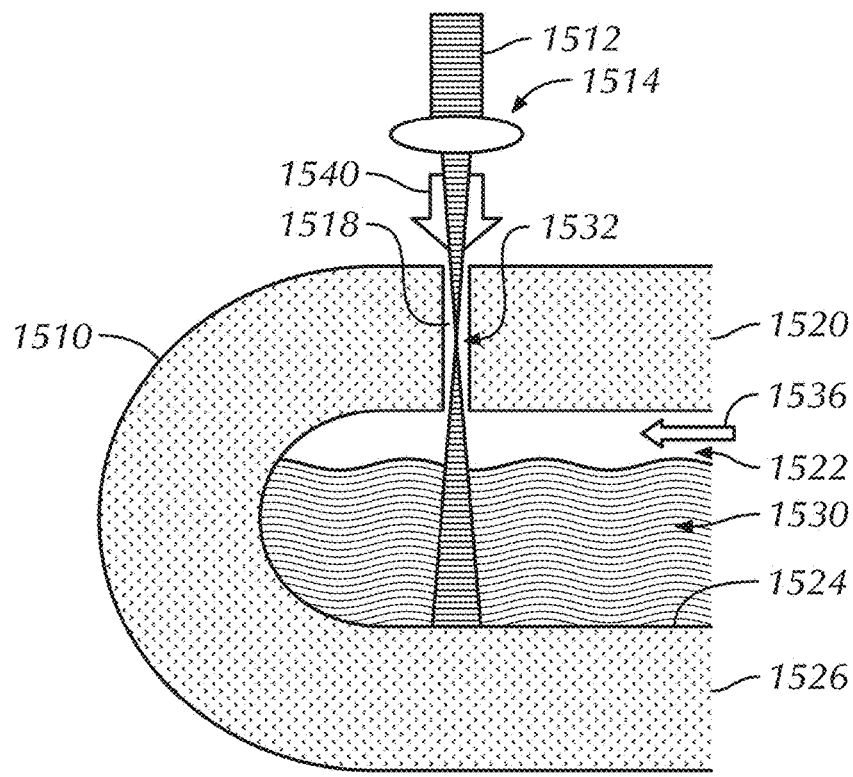
FIG. 15 depicts a simplified diagram, cross-sectional view of an object during laser machined in accordance with some embodiments.

FIG. 15 depicts a simplified diagram, cross-sectional view of an object 1510 during laser machined in accordance with some embodiments. Laser pulses 1512 are directed at the object 1510 through optics 1514 and the like to implement the laser machining, such as laser drilling one or more holes 1518 into a wall 1520 of the object 1510. Following breakthrough of the wall 1520, subsequent laser pulses continue to be directed at the object to achieve a desired quality and/or width of the hole 1518. As such, at least a portion of the laser pulses directed at the object 1510 following the breakthrough pass through the hole to enter the cavity 1522 of the object and can continue across the cavity to impinge upon a surface 1524 of a backwall 1526 (where the backwall 1526 of some objects 1510 is a continuation of or the same wall 1520 being laser machined at an opposing side of the cavity 1522) and can potentially damage the backwall. The laser pulses impinging directly on the backwall surface 1524 can produce a plasma of the material of the backwall 1526 that can damage the backwall and/or reduce the integrity of the backwall at that point, produce hot gases, stream and in some instances produce some debris as portions of the backwall may be ejected resulting in damage to the backwall.

Accordingly, some embodiments direct a fluid 1530 into the cavity 1522 while performing the laser machining. The fluid typically does not include laser absorption properties, and in some instances is water, alcohol or other relevant fluids. A surfactant may be included with the fluid in some implementations to help wet the backwall surface. The amount of fluid 1530 maintained on the backwall surface 1524 can depend on the intensity and/or power of the laser pulse 1512, the distance of the backwall surface 1524 from the laser focus 1532, the material of the backwall, the duration of laser pulses, the duration between pulses and/or other such factors. The flow of fluid into the cavity can depend on the volume of the cavity, the rate of pulses, expected bubble formation, collapse and/or dispersion, and/or other such factors. Further, the flow rate can be controlled to prevent the fluid from enter the hole being laser drilled. Again, interior and/or exterior gas jets can also be used to keep the fluid away from the hole.

Further, the duration between laser pulses and/or bursts of laser pulses is further controlled to reduce the potential backwall damage that might otherwise occur. It has been identified that while the fluid, such as water, is in contact with the backwall surface 1524, the reflectivity at the backwall surface 1524 is enhanced. With the enhanced reflectivity, the fluid and backwall surface together inhibit backwall damage with the laser pulses impinging upon the backwall surface 1524 readily being reflect from the backwall surface and accordingly result in minimal if any ablation, plasma formation and/or other damage at the backwall surface while the reflectivity is maintained. The reflected laser pulses continue to spread reducing the intensity and the likelihood of causing further damage to the interior surface of the cavity 1522.

It has further been identified, however, that the laser pulses 1512 can cause the formation of cavitation or bubbles within the fluid 1530. The formation of the bubbles at or proximate to the backwall surface 1524 can reduce the reflectivity of the backwall surface, for example do to the lack of the fluid 1530 on the backwall surface when a bubble forms at the backwall surface. With the reduced reflectivity, subsequent laser pulses can cause damage and/or increased ablation at the backwall surface 1524, for example, due to the laser pulse impinging upon a dry or substantially dry portion of the backwall surface 1524 where a bubble has formed. Accordingly, some embodiments reduce and/or eliminate potential backwall damage by controlling the timing of the laser pulses directed at the object 1510 while fluid in delivered into the cavity so that bubbles formed as a result of one or more previous laser pulses substantially or fully collapse before a subsequent pulse is directed at the object. As a result, the fluid 1530 is in contact with the backwall surface 1524 and provides the enhanced reflectivity, which reduces plasma formation and/or ablation of the backwall surface.

Further, some embodiments additionally direct a flow of gas 1536 (e.g., air, nitrogen, argon, helium or other relevant gas) into the cavity 1522, typically across the area to be laser machined. Accordingly, the flow of gas 1536 can limit or prevent the fluid 1530 from entering the hole 1518 when formed and/or contacting the hole, which can potentially cause flaring at the surface of the hole 1518 in some instances. Additionally, some embodiments direct one or more flows of gas 1540 into the hole 1518 and/or across an exterior surface of object 1510, which in part can remove debris during laser machining and/or inhibit fluid from the interior of the cavity from entering the hole.

Figure 16A:
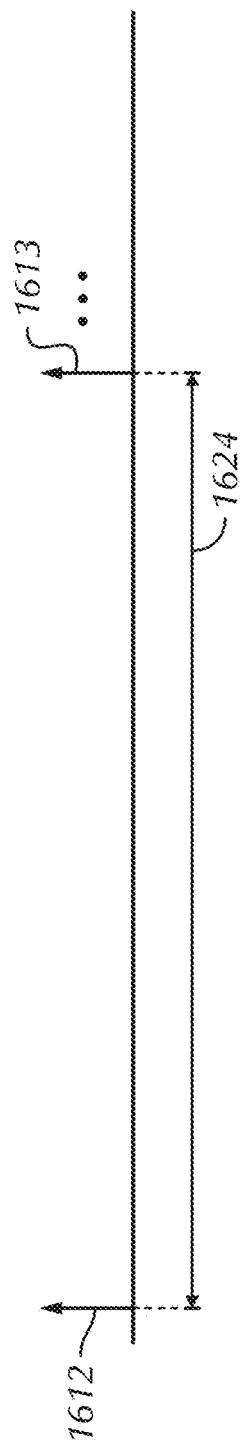
FIG. 16A depicts a simplified timing diagram representative of laser pulse timing used in performing laser machining in accordance with some embodiments.

FIG. 16A depicts a simplified timing diagram representative of laser pulse timing used in performing laser machining in accordance with some embodiments. A series of laser pulses 1612-1613 are directed at an object being laser machined. It has been discovered that at least with some laser intensities and distances from a focus of the laser, bubbles may be formed at the backwall 1524 of the cavity 1522 of the object as a result of the laser pulse 1612. Bubbles that may form proximate to or adjacent the backwall 1524 can result in one or more subsequent laser pulses impinging upon a dry or substantially dry portion of the backwall due to the bubbles, which can reduce reflectivity at the backwall and/or reduce a cooling effect provided by the liquid.

Accordingly, the laser system can be controlled such that a second laser pulse 1613 is not directed at the object 1510 until the expiration of the second duration 1622 following the first burst 1612. Accordingly, the laser system is controlled such that a subsequent second pulse 1613 is not directed at the object 1510 for a predicted duration or amount of time 1624 that is predicted for substantially all or all of the bubbles proximate the backwall surface 1524 to collapse or disperse. Again, the duration 1624 is partially defined based on the laser intensity or power, the distance between the laser focus 1532 and the backwall surface 1524, the fluid 1530, the predicted time for the formation and collapse of substantially all of the bubbles formed at the backwall surface 1524 by the first laser pulse 1612, and other such factors. As an example, the duration 1624 between subsequent pulses 1612-1613 can be about 0.5 ms. Bubbles produced in the fluid resulting from the initial laser burst typically collapse relatively quickly at the backwall, particularly when the laser intensity at the backwall is relatively low.

Figure 16B:
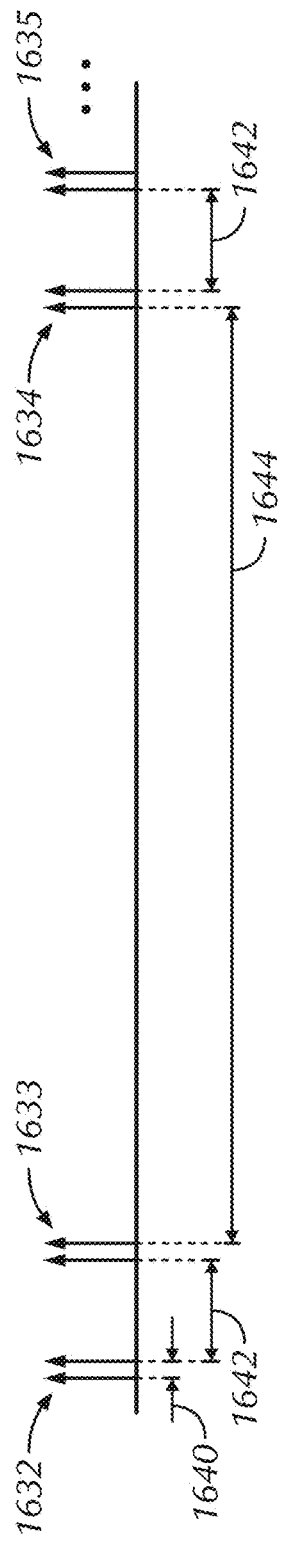
FIG. 16B depicts a simplified timing diagram representative of laser pulse timing used in performing laser machining in accordance with some embodiments.

FIG. 16B depicts a simplified timing diagram representative of laser pulse timing used in performing laser machining in accordance with some embodiments. As described above, and as described in U.S. Pat. No. 6,664,498, the use of bursts 1632-1635 of laser pulses can enhance laser drilling and/or laser machining. It has been discovered that at least with some laser intensities a first burst 1632 of two laser pulses separated by a first duration 1640 may not produce bubbles at the backwall surface 1524. Further, the second duration 1642 between laser bursts 1632-1633 is selected such that bubbles are not formed before the second burst 1633. In some instances, bubbles may be formed at or proximate the laser focus 1532 when the fluid 1530 is present at or near the focus; however, bubbles typically are not form proximate the backwall as a result of the first burst 1632, or are not formed at least prior to the second burst 1633 impinges upon the backwall surface 1524.

Accordingly, a second burst 1633 can be directed at the object 1510 the second duration 1642 following the first burst 1632. Those portions of the pulses of the second burst 1633 that pass through the hole 1518 will impinge upon the backwall surface 1524 while the fluid 1530 is in contact with the backwall surface and prior to bubble formation.

Bubbles are likely to form in response to the second burst 1633 of the first set of bursts. Accordingly, a subsequent third burst 1634 of a second set of bursts is directed at the object 1510 following a third duration 1644, which is typically relatively large compared with the first duration 1640 separating pulses within a burst (e.g., hundreds times greater times, or thousands times greater than the time duration 1640 between the pulses), and greater than the second duration 1642 between the first and second bursts 1632-1633 (e.g., five, tens or hundreds times greater than the time duration 1642 between bursts of a first set of bursts).

The third duration 1644 is defined based on the laser intensity or power, the distance between the laser focus 1532 and the backwall surface 1524, the fluid 1530, the viscosity, density, and surface tension of the fluid, the incident angle on the backwall, the flow rate, the predicted time for the formation and collapse and/or dispersion of substantially all of the bubbles formed at the backwall surface 1524 by the first and/or second bursts 1632-1633, and other such factors. As an example, the first duration 1640 between pulses of a burst 1632 can be between about 50-200 ns, and the second duration 1642 between the first and second bursts 1632-1633 can be about 0.1 ms. The sets of bursts separated by the third duration 1644 can be about 0.5 ms. Accordingly, bubbles produced in the fluid resulting from the two successive laser bursts typically collapse relatively quickly at the backwall, particularly when the laser intensity at the backwall is relatively low. Some embodiments take into consideration an estimated time for various sized bubbles to collapse when driven by surface tension for various estimated sizes of bubbles. The suitability of the timing was verified through testing by creating and avoiding backwall damage in a tube. Again, the fluid flow may aid in collapsing the bubbles and/or moving the bubbles away from the backwall where the laser is to impinge.

With some embodiments, according to some testing, the intensity in the laser was on the order of between about 10× and 100× more intense at the laser focus than at the location of the backwall that was about 2-3 mm away from the laser focus (e.g., the laser intensity on the backwall may in at least some implementations be in the range of between $10^7$ W/cm$^2$ and $10^9$ W/cm$^2$). Accordingly, the bubble formation at the backwall surface is less than that which would occur at the laser focus. Further, a single pulse may not form bubbles at the backwall surface allowing multiple pulses of a burst to be used to improve tooling while still limiting or avoiding backwall damage. It is noted that the fluid directed into the cavity can aid in dispersing and removing some of the bubbles. A high rate of fluid flow can aid in sweeping at least some of the bubbles away. Similarly, in some instances, the flow of fluid may disperse or sweep substantially all of not all of the bubbles away from the backwall where the laser is impinging, which can allowing a substantially continuous operation of the laser system, such as continuous laser bursts with a much shorter durations between bursts. For example, depending on the size of the cavity, the flow could be on the order of 5 m/s. Again, however, this flow rate may be difficult to maintain in tight geometries, such as some fuel injector geometries.

The backwall protection provided by the present embodiments, however, is not limited to these laser pulses and/or timing. Alternatively, the backwall protection can be utilized with substantially any laser pulses, laser pulse durations and/or durations between pulses or bursts of pulses while taking into consideration the bubble formation and time for the bubbles to collapse, dissipate and/or move away from the area where the laser is to impinge. Further, the pulse switching and/or control can similarly be utilized in cooperation with the backwall protection substrate (e.g., substrate 312). Accordingly, pulse and/or burst control can be utilized while the backwall protection substrate is positioned within the cavity of the object being laser machined.

In some instances, the fluid 1530 may partially enter the hole 1518 being laser machined and accordingly be proximate to the laser focus 1532. The bubble formation that may occur proximate the laser focus 1532 can in some instances enhance laser machining. For example, the formation of the bubbles proximate the laser focus as a result of the first burst 1632 can allow the second burst 1633 to impinge upon a relatively dry surface due to the bubble formation providing improved plasma formation and ablation proximate the laser focus a, which can improve the laser machining in achieving the desired laser machining (e.g., formation of a hole 1518), and can further prevent the entrainment of the fluid in the hole.

Figure 17:
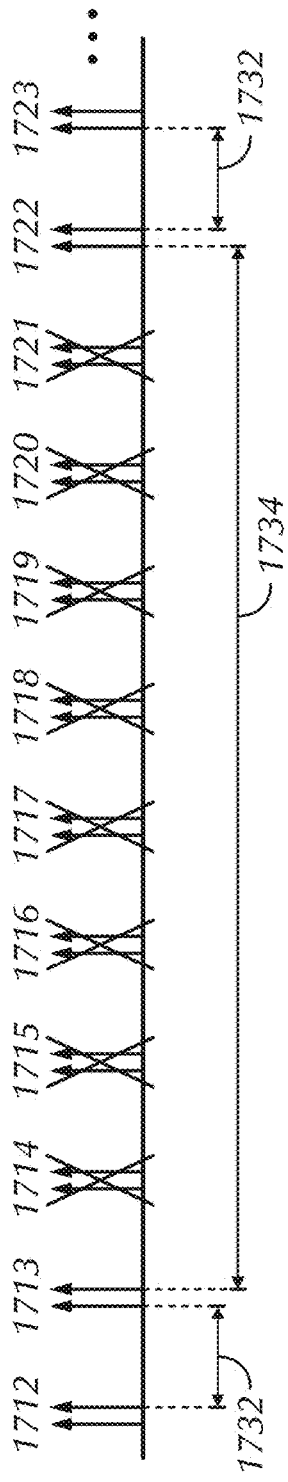
FIG. 17 shows a simplified timing diagram representative of laser pulse timing used in performing laser machining in accordance with some embodiments.

FIG. 17 shows a simplified timing diagram representative of laser pulse timing used in performing laser machining in accordance with some embodiments. A laser system can generate a series of bursts 1712-1723. A sub-set of these bursts can be selected and directed at the object to perform the laser machining in accordance with the predefined timing. In some instances, a pulse slicer can be controlled based on the predefined timing to select those desired pulses to be directed at the object. For example, first and second bursts 1712-1713 can be selected, with the first and second bursts being separated by a first duration (e.g., first duration 1732). As described above, in some instances, with the first and second bursts being timed, bubbles do not form at the backwall surface until after the second burst 1713. A series of subsequent bursts 1714-1721 can be skipped and not directed at the object 1510. Based on an expected timed for bubbles to collapse at the backwall surface 1524, the second duration 1734 is determined and the slicer can select a second sub-set of bursts to be directed at the object 1510, for example, the eleventh and twelfth bursts 1722-1723, corresponding to the desired duration between sets of bursts. As such, a second sub-set of bursts are selected in accordance with the predefined timing so that the eleventh and twelfth bursts 1722-1723 impinge upon the backwall surface 1524 after substantially all or all of the bubbles formed as a result of the first sub-set of bursts collapse and the fluid 1530 is in contact with the backwall surface 1524. In some instances, a pair of bursts can be selected from each of a predefined number of bursts (e.g., two burst are selected from each set of ten bursts).

Figure 18:
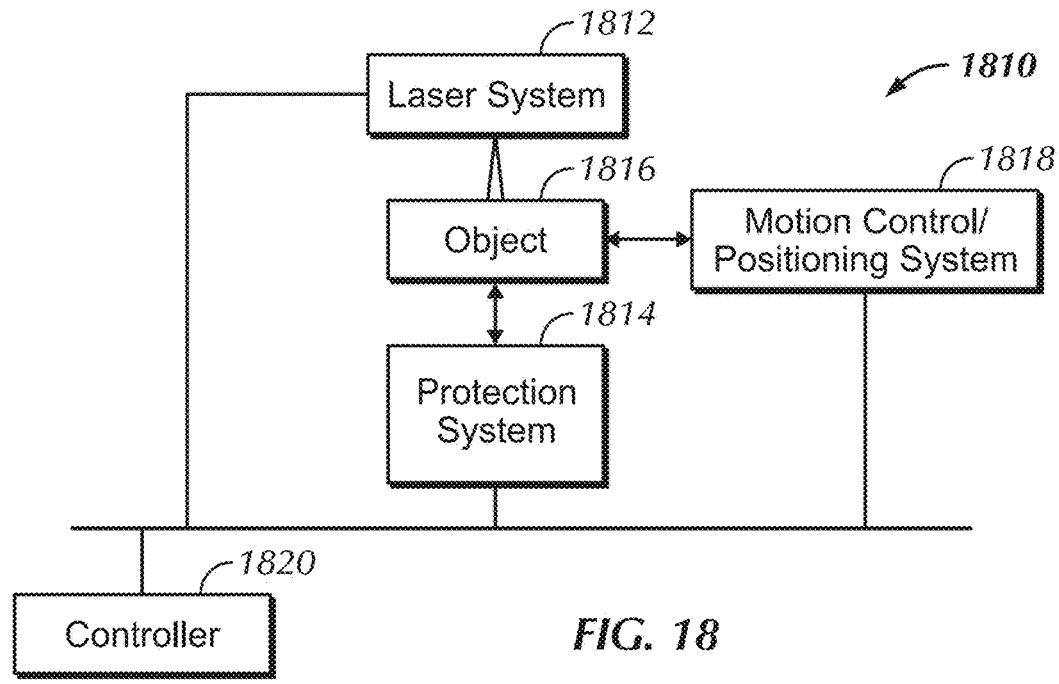
FIG. 18 depicts a simplified block diagram of a laser machining system, according to some embodiments.

FIG. 18 depicts a simplified block diagram of a laser machining system 1810, according to some embodiments. The laser machining system 1810 includes a laser system 1812, a protection system 1814 that cooperates with the object 1816 to be laser machined, a motion control and/or positioning system 1818 (referred to below as the positioning system), and a controller 1820.

The controller 820 can be configured as a single device or separate devices, such as including controllers in the laser system 1812, protection system 1814 and/or positioning system 1818. In some embodiments, the controller 1820 comprises one or more processors and/or microprocessors coupled with memory that stores code, instructions and/or software for controlling the laser machining system 1810. In some implementations, the controller 1820 can be at least partially implemented through a computer coupled with one or more of the laser system 1812, the protection system 1814 and the positioning system 1818.

The laser system 1812 generates the laser pulses and directs the laser pulses to accurately impact the object 1816 being laser machined at the desired location on the object. Typically, the laser system 1812 includes optics, slicers and the like to focus and direct the laser pulses to impinge upon the object 1816. In some embodiments, the laser system 1812 includes additional elements and/or features, such as delay paths and the like to produce one or more laser pulse to impinge upon the object 1816 to achieve the desired laser machining.

The protection system 1814 cooperates with the controller 1820 and the object 1816 to provide backwall protection to the portion of the object opposite the hole or other machining being generated. In some embodiments, the protection system 1814 supplies a fluid into the cavity such that the fluid provides protection for the backwall of a cavity of the object 1816 opposite the portion of the object being laser machined. The protection system 1814 further includes a slicer controller (e.g., the pulse slicer 914 and timer and/or signal processor 946) that cooperates with the laser system 1810 and/or is part of the laser system 1810 to control the selection of a sub-set of pulses and/or bursts of pulses from a series of pulses and/or bursts. Accordingly, slicer 914, the controller 1820 and the signal processor 946 can, in some implementations, direct a sub-set of a series of pulses or bursts of pulses at the object 1816 while preventing some of the pulses or bursts of pulses from being directed at the object to control the bubble formation and/or collapse of bubbles at the backwall surface 1524 in protecting the backwall surface. In some implementations, the protection system 1814 can include additional or alternative components, such as but not limited to a gas supply system 926 that can supply one or more interior or exterior streams of gas (e.g., an exterior coaxial gas assist jet, one or more jets along an exterior, and/or other such assist jets) relative to the object 1816, a fluid supply system 936 to supply the fluid into the cavity, one or more flow meters 932, 940, pressure regulators 930, burn through detectors 944 and/or other such components.

The positioning system 1818 can cooperate with the laser system 1812, the protection system 1814 and/or the object 1816 to position the components of the laser machining system 1810 to accurately laser machine the object 1816 while providing backwall protection. The positioning system can include one or more motors, gears, pumps, pistons, hydraulics, cables, end effectors, pincers, and/or other such devices to position components relative to each other. For example, in some implementations, the positioning system 1818 is cooperated with the object 1816 to control the positioning and/or maintaining the positioning of the object during laser machining and/or to reposition the object to perform further laser machining (e.g., laser drilling multiple holes into the object 1816). Additionally or alternatively, the positioning system 1818 can cooperate with the protection system 1814 to position at least a portion of the protection system to accurately apply fluid into the cavity. Similarly, in some embodiments, the positioning system may in part provide some control over positioning of the laser system 1812 or portions of the laser system to accurately focus and direct the laser pulse onto the object 1816.

Figure 19:
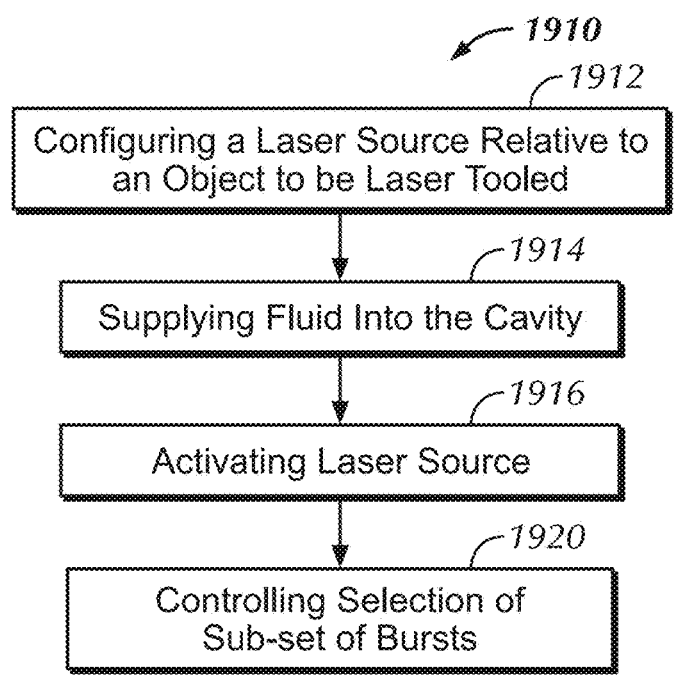
FIG. 19 depicts a simplified flow diagram of a process of providing backwall protection during laser machining, in accordance with some embodiments.

FIG. 19 depicts a simplified flow diagram of a process 1910 of providing backwall protection during laser machining, in accordance with some embodiments. In step 1912, a laser source is configured relative to an object to be laser machined (e.g., object 1510). This can include setting a laser power and other such parameters. Further, this can include the positioning of the laser source, the object to be laser machined and/or the protection system and/or substrate. In some embodiments, the protection system is fixed and the object to be laser machined is moved into position such that the protection substrate is at a desired position. In other embodiments, the object is positioned in a fixed position and the protection system is moved into position relative to the surface of the object to be protected. Further, the positioning can be based on registers, sensors and/or contact of one or more parts of the protection system with one or more parts of the object to be laser machined.

In step 1914, a fluid is supplied into a cavity of the object 1510 being laser machined to at least maintain a layer of fluid over a backwall surface 1524. In step 1916, the laser source is activated. In step 1920, a selection of a sub-set of laser pulses are directed at the object 1510, where a timing between laser pulses directed at the object are controlled according to laser intensity, distance from a focus to the backwall surface 1524, the fluid being supplied into the cavity, the predicted bubble collapse rate in the supplied fluid, and other such factors. As described above, in some instances, laser bursts comprising multiple laser pulses can be utilized, and in some instances sets of bursts are directed at the object 1510 with the duration between sets of bursts being predefined according to an expected time for bubbles formed at the backwall surface 1524 to collapse.

Figure 20:
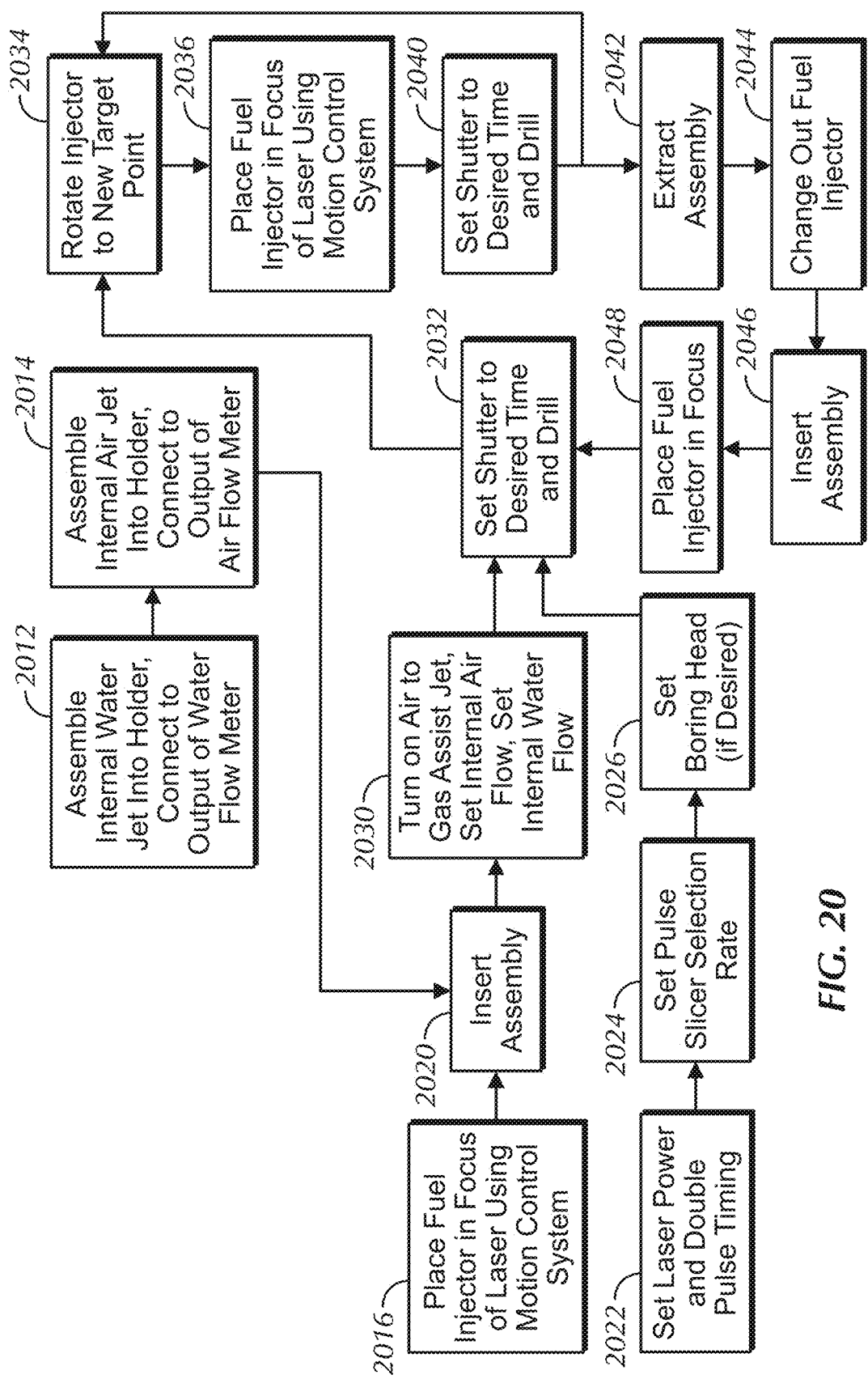
FIG. 20 depicts a simplified flow diagram of a process of laser machining an object in accordance with some embodiments.

FIG. 20 depicts a simplified flow diagram of a process 2010 of laser machining an object 1816 in accordance with some embodiments. For example, the process 2010 can be used in laser drilling a plurality of holes into an airplane or engine parts (turbine blade), fuel injector or other object where laser machining is to be performed on at least one side of a cavity, which can expose the opposite side of the cavity to potential damage. In step 2012, a fluid delivery device (e.g., nozzle or jet) is cooperated with a holder (e.g., a positioning holder 712) and connected with an output of a fluid supply system 936 (e.g., to an output of a flow meter 940). In some embodiments, the process includes step 2014, where a gas delivery device (e.g., nozzle or jet) is assembled with the holder (e.g., positioning holder 712), and connected to the output of the gas supply system 926 (e.g., an output of a flow meter 932).

In step 2016, an object 1816 to be laser machined (e.g., a fuel injector) is positioned so that a portion of the object to be laser machined will be at the focus of the laser when activated. In some embodiments, the positioning system 1818 can position the object 1816 at the desired location. In step 2020, the fluid delivery device is positioned relative to the cavity of the object 1816 to maintain a desired water level within the cavity. It can be desirable, in some instances, that the cavity be substantially filled with fluid. In some embodiments, the gas delivery device is similarly positioned relative to the interior of the cavity to direct a flow of gas across a portion of the surface where the laser machining is to be performed (e.g., where a hole is to be drilled). In other embodiments, the fluid and/or gas delivery devices are positioned and the object is then subsequently positioned relative to the fluid and/or gas delivery devices.

In step 2022, laser parameters are set for the laser system 1810, such as laser power, pulse timing (e.g., double pulse timing) and other such relevant parameters. In step 2024, the one or more pulse slicers 914 are configures to set a selection rate, which can include selecting a sub-set of laser bursts to be directed at the object 1816 while directing a remainder of laser bursts away from the object. In some embodiments, steps 2022 and 2024 are configured according to a predefined machining plan, which may include varying over time one or more of the laser parameters and/or the selection rates during the laser machining, such as based on timing of predicted burn through and/or in response to detecting burn through. In step 2026, the beam delivery system 916 is configured, such as setting a boring head when desired.

In step 2030, the fluid supply system 936 and gas supply system 926 are configured to set the fluid and gas flow rates and activated to initiate the supply of fluid and gas to the interior of the cavity of the object 1816. In some embodiments, a gas is further delivered to a gas assist jet when relevant. In step 2032, the one or more shutters are set to desired timing and laser drilling is activated to drill a first hole in the object 1816.

In some embodiments, multiple holes or other laser machining may be performed on the object 1816. For example, when the object is a fuel injector, typically multiple holes are laser drilled into the fuel injector. Accordingly, some embodiments include step 2034, where the object 1816 is rotated or otherwise moved to a new target point on the object 1816. In step 2036, the object 1816 is positioned at the focus of the laser. In some implementations, the rotation and positioning of the object 1816 is implemented by the positioning system 1818. In step 1840, the one or more shutters are set to the desired drill time and laser drilling is implemented. When further laser drilling and/or machining is to be performed the process 2010 can return to step 2034 to rotate or otherwise reposition the object 1816 for subsequent laser drilling or machining.

When the laser drilling is complete the process continues to step 2042 where the fluid delivery device and/or gas delivery device can be removed from the cavity when they are positioned within the cavity. In step 2044, a subsequent object 1816 is positioned relative to the laser system 1810. In step 2048, the fluid delivery device is positioned relative to the cavity, and when relevant a gas delivery device can be positioned relative to the cavity. In step 2048, the subsequent object 1816 is positioned relative to the laser focus. The process 2010 can then return to step 2032 to set the shutter timing and implement laser drilling of the subsequent object.

Accordingly, the present embodiments provide protection to a surface opposite a portion of an object being laser machined. This protection allows highly accurate and precise laser machining of an object while the object is protected from peripheral damage that may degrade the object or actually make the object unusable. Further, when utilized in manufacturing applications the backwall protection provided by the present embodiments can greatly improve throughput while significantly reducing, if not eliminating, the number of objects that have to be discarded because of peripheral damage that exceeds threshold levels. Additionally, the protection is achieved without having to introduce a substance that would require significant cleaning and without producing a dangerous waste product.

Figure 21:
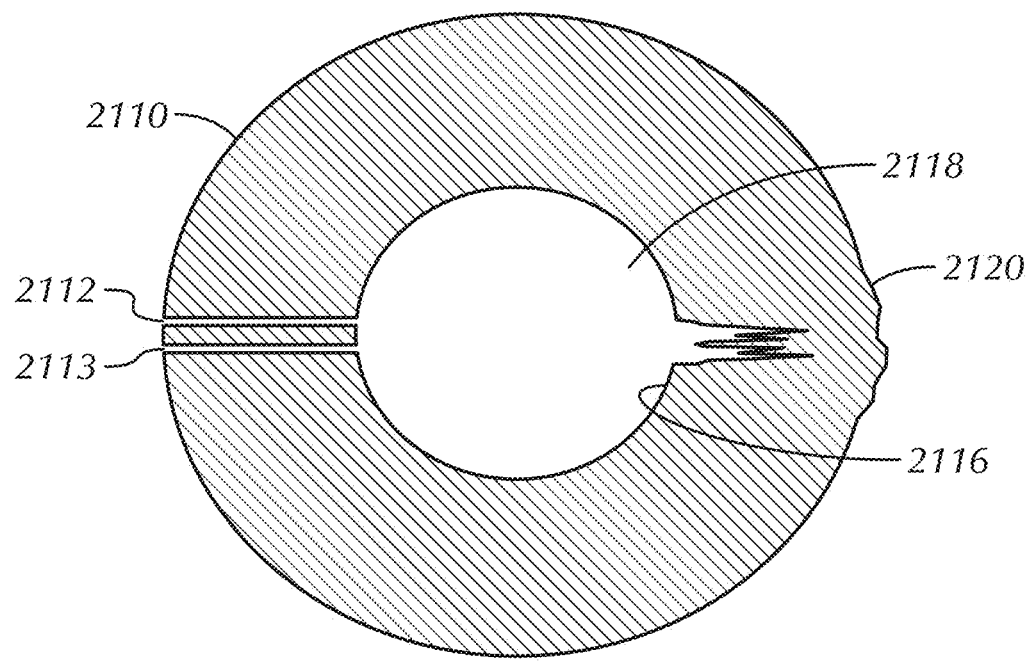
FIG. 21 shows an example cross-sectional view of an object that has been laser drilled without backwall protection.

FIG. 21 shows an example cross-sectional view of an object 2110 that has been laser drilled without backwall protection. The laser drilling produced two holes 2112-2113 or channels extending through the wall of the object 2110. As can be seen, during the laser drilling the laser pulses impinge on the backwall surface 2116 of the cavity 2118 that is opposite the holes 2112-2113 formed by the laser pulses and can produce significant damage to the backwall surface 2116. In some instances, the damage includes damage to the wall and structure of the object (e.g., heat affected zones (HAZ)), and in some instances the damage can extend through the wall to an exterior of the wall 2120 and/or one or more holes can form through the wall. Depending on the extent of the damage the object 2110 being laser machined may be unusable for its intended purpose or have a greatly reduced useful life expectancy. For example, laser machining parts of jet engines and/or fuel injectors may have zero or very limited tolerance for damage.

Figure 22:
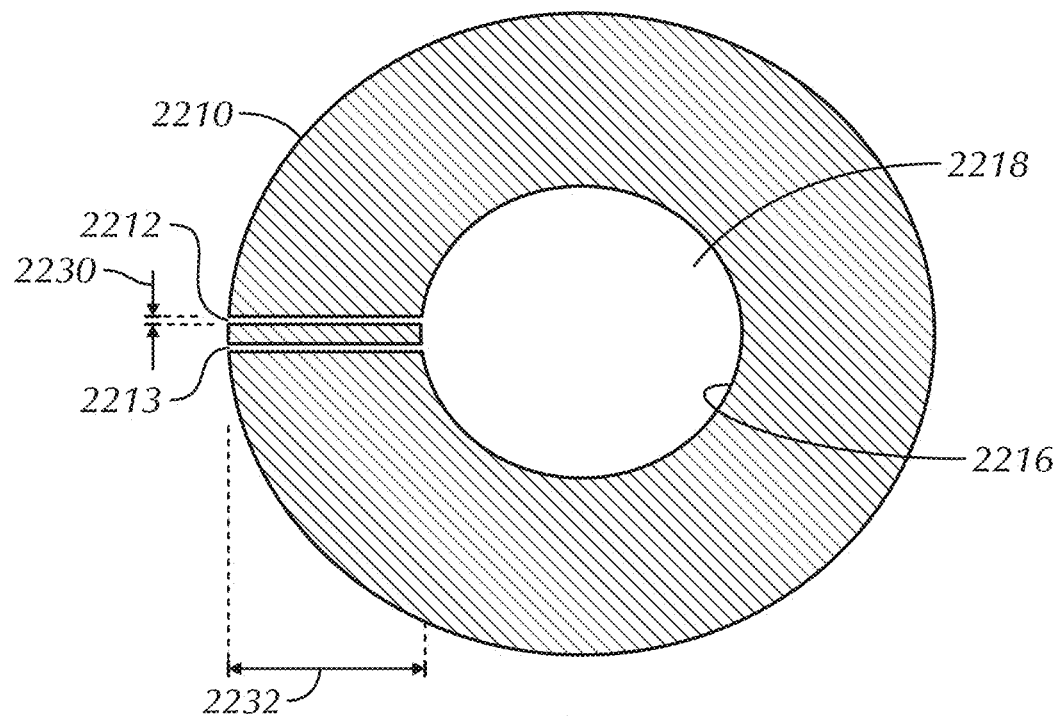
FIG. 22, however, shows an example cross-sectional view of an object that has been laser drilled while applying backwall protection in accordance with some embodiments.

FIG. 22, however, shows an example cross-sectional view of an object 2210 that has been laser drilled while applying backwall protection in accordance with some embodiments. By providing the backwall protection, one or more holes 2212-2213, channels or other laser machining can be precisely generated in the object 2210 without damaging the backwall surface 2216 of the cavity 2218 that is opposite the holes 2212-2213. Accordingly, the use of the backwall protection can greatly improve the quality of objects being produced, increase the throughput of the number objects that can be used for their intended purpose, increase the useful life of objects laser machined and other such benefits.

Further, the backwall protection provided by some embodiments can allow the laser machining to be very precise and highly precisioned. For example, in some embodiments, laser holes 2212-2213 can be formed that have a diameter 2230 that are about 50 microns extending through an object having a steel wall with a thickness 2232 of about 1.4 mm or more (e.g., a 1.0 mm wall thickness with the hole formed at a 45 degree angle), with no HAZ effects. Furthermore, the laser machining can produce holes in close proximity while still limiting or preventing backwall damage. For example, two holes 2212-2213 can be formed within 150 μm or less of each other. Additionally, the backwall protection prevents interior debris from the backwall surface, prevents hot splatter and limits or prevents exposure to hot plasma at the backwall surface. Some embodiments further provide protection of the backwall regardless of the material being laser machined without having to entrain protection material within the cavity and/or on the backwall surface, which may require extensive and/or costly cleaning to remove the protection material.

Those embodiments that utilize the protection substrate 312 and/or protection system 310 that is inserted into a cavity and/or between the anticipated laser and the backwall surface can typically be utilized to withstand higher laser intensities and/or powers than the embodiments that do not utilize the protection substrate 312. Further, pulse timing when performing laser machining while a protection substrate 312 is positioned within the cavity can be configured so that the timing between pulses and/or bursts can be reduced relative to the timing when utilizing backwall protection without the protection substrate 312 and instead controlling the burst timing to allow the collapse of bubbles formed by previous pulses or bursts.

Figure 23:
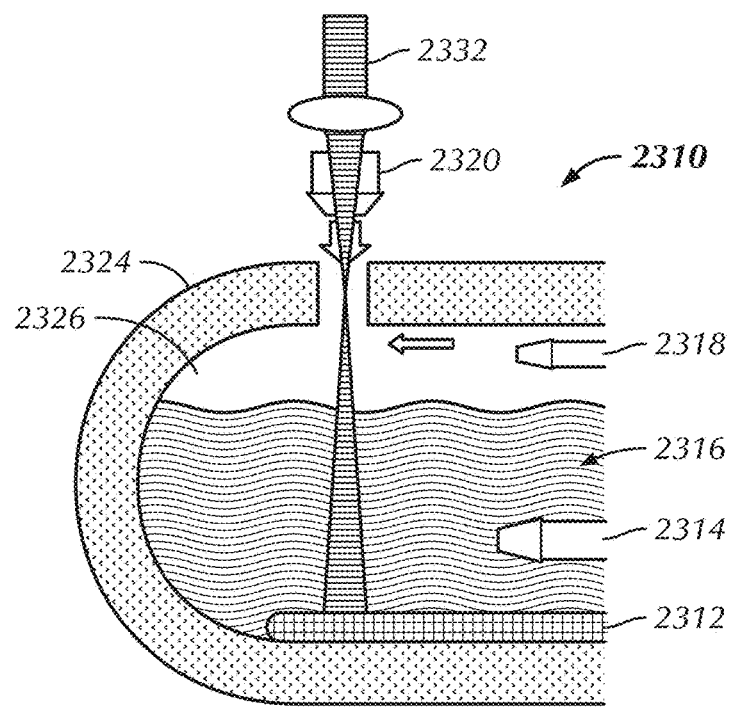
FIG. 23 depicts a simplified diagram, cross-sectional view of a laser machining protection system according to some embodiments.

FIG. 23 depicts a simplified diagram, cross-sectional view of a laser machining protection system 2310 according to some embodiments. The protection system 2310 includes a sacrificial insert or protection substrate 2312, a fluid source 2314 supplying a fluid 2316, and one or more gas sources 2318, 2320. The protection substrate 2312 is positioned proximate to or in contact with a backwall surface of the object 2324 being laser machined. The fluid source 2314 is positioned relative to the cavity 2326 of the object such that a layer of fluid 2316 is maintained within the cavity. The fluid source 2314, such as a conduit, nozzle or the like is part of a fluid supply system 936 that controls the flow of fluid into the cavity. Similarly, in some embodiments, the gas source 2318 can be a conduit, nozzle or the like that is part of a gas supply system 926 that provides a gas (e.g., air) into the cavity and along the surface of the cavity to limit or prevent the fluid 2316 from entering the hole 2330. Some embodiments may include a second gas source 2320 that is part of a gas supply system 926 or a separate gas supply system that directs a gas (e.g., air) coaxially with the laser 2332 (it is noted that one or more additional or alternative gas sources may be included, such as a nozzle to supply a gas across the exterior surface of the object 2324).

The fluid 2316 typically does not have laser absorption or dispersion properties and provides a cooling of the protection substrate 2312. Laser pulses 2332 pass through the hole 2330 as the hole continues to be formed to impinge upon the protection substrate 2312. As such, the protection substrate 2312 and fluid 2316 provide protection of the backwall of the object 2324 during the laser machining. In some instances, the fluid 2316 is directed to flow across the protection substrate 2312, which can move bubbles that might form within the fluid away from the area being impinged upon by the laser such that the fluid continues to be in contact with the surface of the protection substrate and enhancing reflectivity at the surface. The protection substrate 2312 can be formed from substantially any relevant material that can withstand repeated exposure to laser pulses used in laser machining the object 2324, such as but not limited to Inconel®, copper, nickel, steel, carbon, ceramic, or other such materials or combinations of such materials. In some instances, the protection substrate 2312 can be formed from a highly reflective material and/or coated with a reflective material. Surface structures and/or irregularities can be included in the protection substrate 2312, such as those described above. In some embodiments, the protection substrate 2312 can be formed from a porous material.

Figure 24:
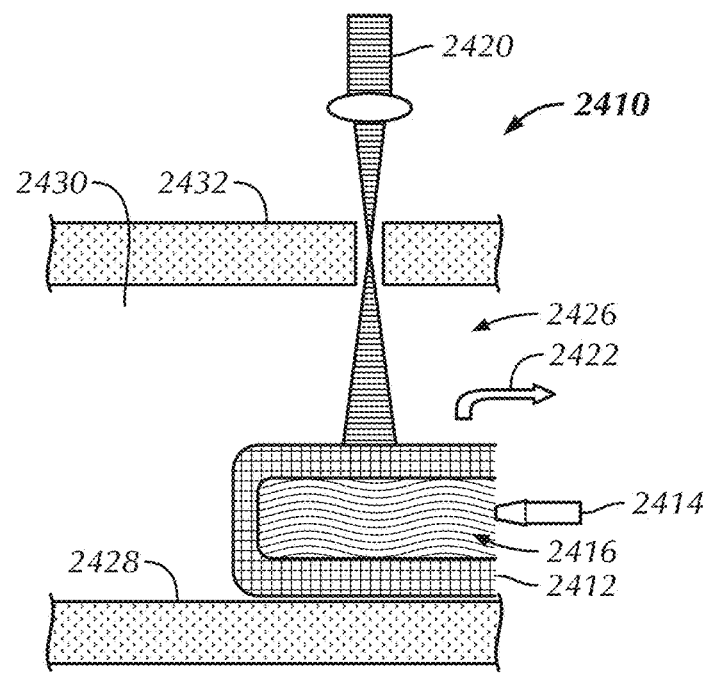
FIG. 24 depicts a simplified, cross-sectional view of an alternative laser machining protection system according to some embodiments.

FIG. 24 depicts a simplified, cross-sectional view of an alternative laser machining protection system 2410 according to some embodiments. The protection system 2410 includes a hollow protection substrate 2412 and a fluid source 2414. The protection substrate 2412 is positioned with a cavity 2426 relative to a backwall 2428 of the object 2432 being laser machined. The fluid source 2414 supplies a fluid 2416 into the hollow portion 2418 of the protection substrate. The protection substrate 2412 is formed of a porous material, such as a porous copper, carbon or the like. Typically, the sizes of the pores in the protection substrate are small enough so that the fluid does not readily flow out of the protection substrate. As the laser pulses 2420 impinge upon the protection substrate 2412 the protection substrate is heated up causing fluid adjacent the exterior surface, within the pores and/or within the interior of the protection substrate to boil generating steam 2422 that is at least partially released through the pores of the protection substrate and can be evacuated from the cavity 2430 of the object 2432, such as through a gas flow, vacuum or the like. In some implementations, the pores are configured such the fluid is forced through the pores (or holes depending on the configuration of the protection substrate) at a desired rate to keep the fluid on the surface of the protection substrate 2412 upon which the laser impinges. As the laser impinges upon the fluid may be boiled away being replaced by further fluid being released through the pores and/or holes.

The protection substrate 2412, in some instances, is positioned proximate the backwall 2428, and often is positioned as close to the backwall, which increases the distance between the protection substrate and a focus of the laser, and taking into consideration the structure of the cavity, the fluid flow and other relevant factors. In some implementations, the protection substrate 2412 can be configured as rotationally symmetric. The rotationally symmetric protection substrate can be rotated during tooling to expose differ portions of the surface while tooling. In some instances, the protection substrate can be continuously rotated.

Figure 25:
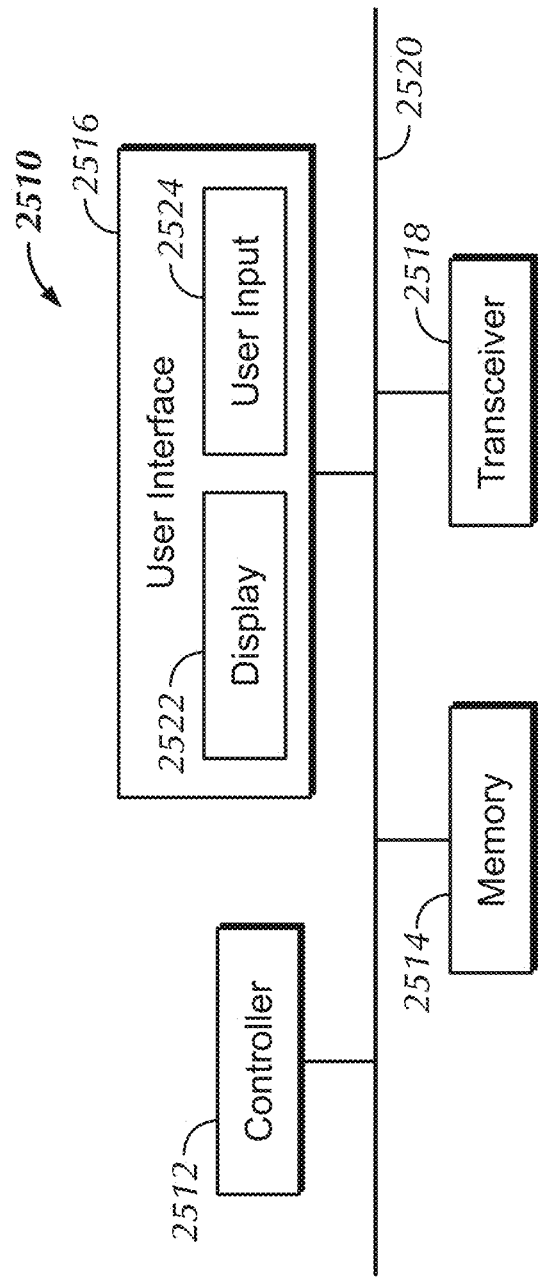
FIG. 25 illustrates a system for use in implementing methods, techniques, control, devices, apparatuses, systems, computers and the like in providing laser machining while protecting a backwall surface of an object being laser machined in accordance with some embodiments.

The methods, techniques, control, systems, devices and the like described herein may be utilized, implemented and/or run on many different types of devices and/or systems in cooperation with one or more laser sources. Referring to FIG. 25, there is illustrated a system 2510 that may be used for any such implementations, in accordance with some embodiments. One or more components of the system 2510 may be used for implementing any device, system or apparatus mentioned above or below, or parts of such systems, apparatuses or devices, such as for example any of the above or below mentioned controllers 820, 922, 946, 1820, positioning systems 818, 924, 1818, and the like. However, the use of the system 2510 or any portion thereof is certainly not required.

By way of example, the system 2510 may comprise a controller or processor module 2512, memory 2514, a user interface 2516, and one or more communication links, paths, buses or the like 2520. A power source or supply (not shown) is included or coupled with the system 2510. The controller 2512 can be implemented through one or more processors, microprocessors, central processing unit, logic, local digital storage, firmware and/or other control hardware and/or software, and may be used to execute or assist in executing the steps of the methods and techniques described herein, and control various activations, positionings, selections, rates, durations, flow rates, pressures, timing, detections, motion, etc. The user interface 2516 can allow a user to interact with the system 2510, set parameters, adjust operating conditions and receive information through the system. In some instances, the user interface 2516 includes a display 2522 and/or one or more user inputs 2524, such as a keyboard, mouse, track ball, buttons, touch screen, remote control, etc., which can be part of or wired or wirelessly coupled with the system 2510.

In some embodiments, the system 2510 can further includes one or more communication interfaces, ports, transceivers 2518 and the like allowing the system 2510 to communication with other components and/or controllers of a laser machining system, communicate with other devices over a distributed network, a local network, the Internet, communication link 2520, other networks or communication channels with other devices and/or other such communications. Further the transceiver 2518 can be configured for wired, wireless, optical, fiber optical cable or other such communication configurations or combinations of such communications.

The system 2510 comprises an example of a control and/or processor-based system with the controller 2512. Again, the controller 2512 can be implemented through one or more processors, controllers, central processing units, logic, software and the like. Further, in some implementations the controller 2512 may provide multiprocessor functionality.

The memory 2514, which can be accessed by the controller 2512, typically includes one or more processor readable and/or computer readable media accessed by at least the controller 2512, and can include volatile and/or nonvolatile media, such as RAM, ROM, EEPROM, flash memory and/or other memory technology. Further, the memory 2514 is shown as internal to the system 2510; however, the memory 2514 can be internal, external or a combination of internal and external memory. The external memory can be substantially any relevant memory such as, but not limited to, one or more of flash memory secure digital (SD) card, universal serial bus (USB) stick or drive, other memory cards, hard drive and other such memory or combinations of such memory. The memory 2514 can store code, software, executables, scripts, parameters, settings, limits and/or thresholds, log or history data, user information and the like.

FIG. 26 shows an image of a protection system 2610 having a protection substrate 2612, which can be similar to the protection substrate 312 of FIG. 4, in accordance with some embodiments. The protection substrate 2612 is cooperated with a fluid conduit 2614 that is substantially straight proximate the protection substrate. Further, the protection substrate 2612 is positioned at an angle to a central axis of the fluid conduit 2614. Further, the angle is often selected such that the laser 2620 also impinges upon the protection substrate at an oblique angle. In this configuration, fluid 2640 (represented by the dashed line) is ejected from the end 2642 of the conduit to directly impact the first surface 2616 of the protection substrate at the angle between the protection substrate and the fluid conduit 2614. Accordingly, the fluid changes direction upon contacting the protection substrate. Further, in some embodiments, fluid 2640 is forced into the apertures 512 of the grid (see FIG. 5) when present in the protection substrate 2612. The conduit 2614 can be substantially any relevant size or diameter 2622 that fits within the cavity of the object being laser machined and allows accurate placement of the protection substrate 2612 relative to the surface of the object to be protected.

FIG. 27 shows an image of a protection system 2710 with a protection substrate 2712 cooperated with a fluid conduit 2714, in accordance with some embodiments. In this embodiment, the fluid conduit 2714 has a reduced diameter 2722 compared to the diameter 2622 of the fluid conduit 2614 of FIG. 26. This narrowing embodiment allows the protection system 2710 to be utilized with and/or inserted into smaller spaces and/or into smaller objects to be laser machined. A protection substrate 2712 extends from the conduit 2714, and typically extends at an angle relative to a central axis of the conduit proximate the end 2742 of the conduit 2714. When in use, the protection substrate 2712 is positioned such that the laser 2620 is incident upon the protection substrate 2722, which in some embodiments includes a plurality of apertures 512 or recesses. In some configurations, the fluid conduit 2714 is additionally different from the fluid conduit 2614 of FIG. 26 in that the fluid conduit can include a bend 2736 proximate to but separated by a distance from the end 2742 of fluid conduit 2714. The bend 2736 can further be incorporated based on the object being laser machined and to allow the protection system 2710 to be positioned relative to a surface of the object to be protected. Accordingly the bend 2736 redirects the fluid causing at least a majority of the fluid to exit the conduit 2714 substantially parallel with the surface of the protection substrate 2712. Typically, the fluid flow through the conduit 2714 is less than the fluid flow through the conduit 2614 of the protection system 2610 of FIG. 26. Further, the parallel path of the fluid limits the amount of fluid that enters the apertures 512, when present.

Figure 28:
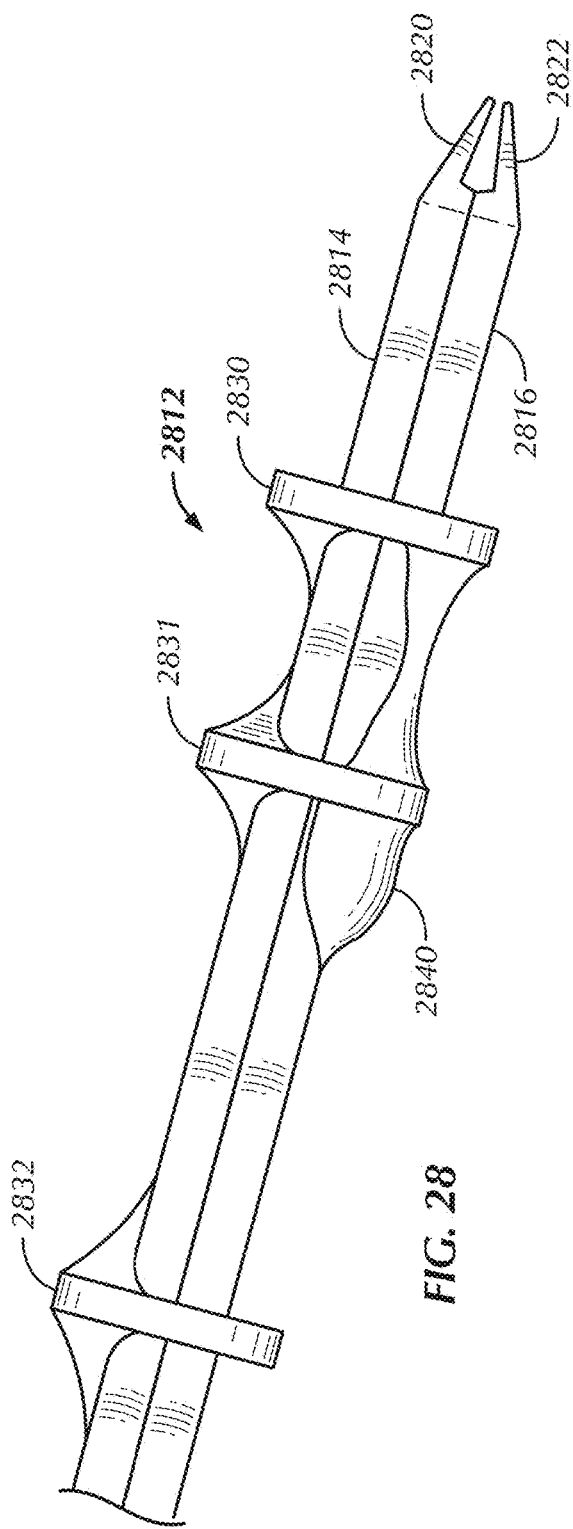
FIG. 28 shows a perspective view of a protection system for use in a laser machining protection system in accordance with some embodiments.
Figure 29:
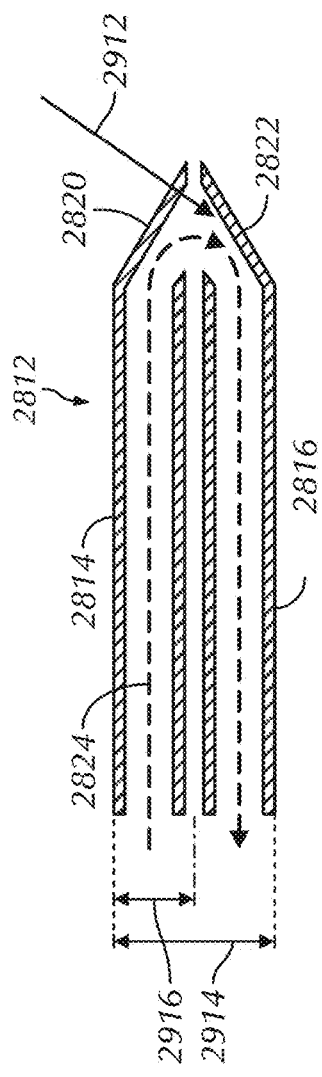
FIG. 29 shows a simplified, cross-sectional view of a portion of the protection system of FIG. 28, in accordance with some embodiments.
Figure 30:
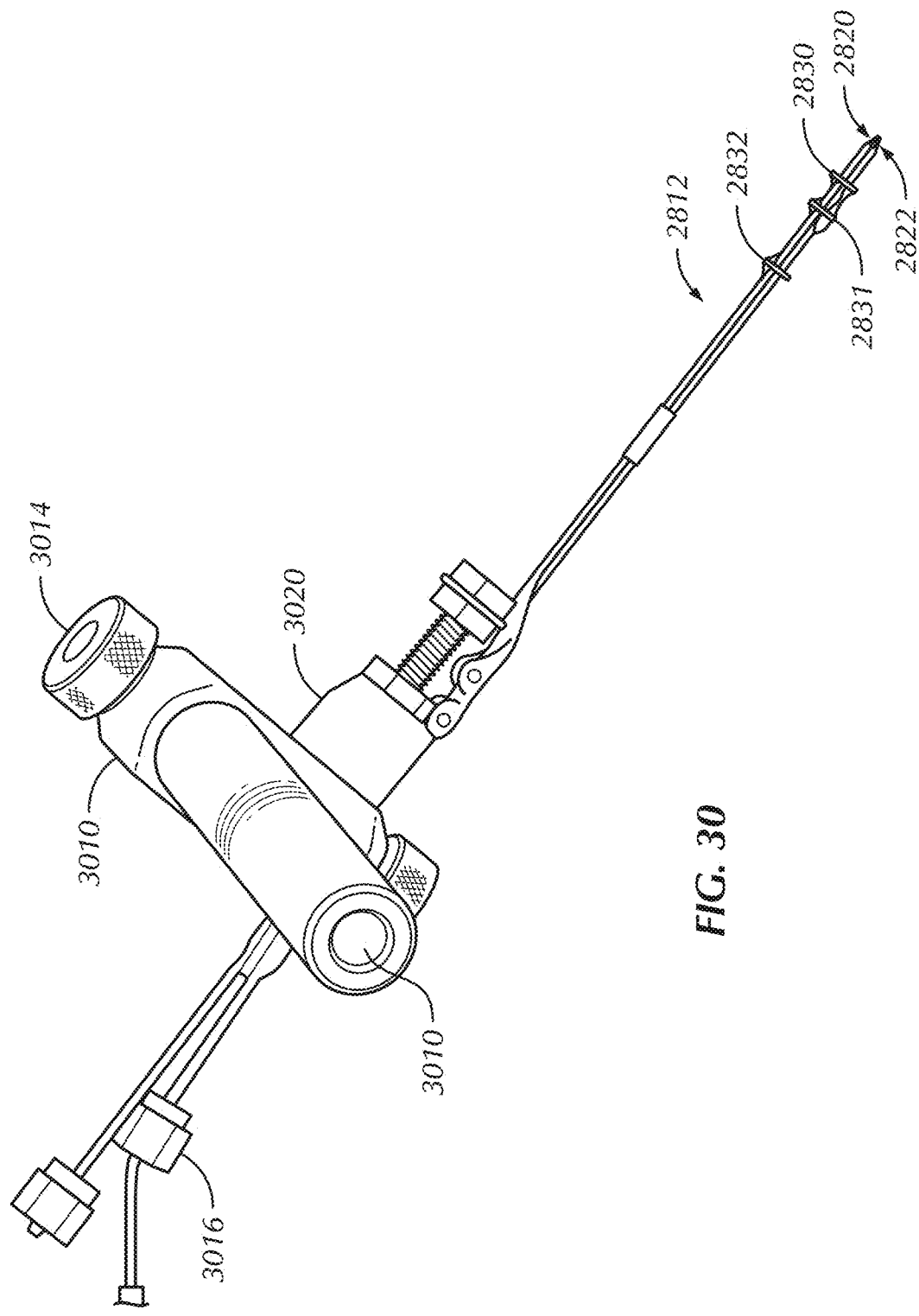
FIG. 30 shows a perspective view of the protection system of FIG. 28 relative to a mounting post that is used to position the protection substrate of the protection system within an object to be laser machined, in accordance with some embodiments.

FIG. 28 shows a perspective view of a protection system 2812 for use in protecting surfaces of an object being laser machined in accordance with some embodiments. FIG. 29 shows a simplified, cross-sectional view along a portion of a length of the protection system 2812 of FIG. 28, in accordance with some embodiments. FIG. 30 shows a perspective view of the protection system 2812 of FIG. 28 relative to a mounting post or apparatus 3010 that is used to position the protection substrate 2822 of the protection system 2812 within an object to be laser machined, in accordance with some embodiments. Referring to FIGS. 28-30, the protection system 2812 includes a first or fluid delivery conduit 2814, a second or fluid removal conduit 2816, a fluid redirecting element 2820, and a protection substrate 2822. In some embodiments, the protection system 2812 includes one or more positioning spacers or registers 2830-2832.

The redirecting element 2820 is positioned proximate an end of the delivery conduit 2814, and in some embodiments is secured with and/or extends from the end of the delivery conduit. Typically, the redirecting element 2820 further extends from the delivery conduit at an angle relative to an axis of the delivery conduit to extend at least partially over the end of the delivery conduit. The protection substrate 2822 is positioned proximate an end of the removal conduit 2816, and in some embodiments is secured with and/or extends from the end of the removal conduit. Similar to the redirecting element 2820, the protection substrate 2822 typically also extends from the removal conduit at an angle relative to an axis of the removal conduit to extend at least partially over the end of the removal conduit 2816.

The delivery conduit 2814 and removal conduit 2816 are positioned such that the redirecting element 2820 and the protection substrate 2822 are positioned juxtaposed to each other. Additionally, in some embodiments, the redirecting element 2820 and the protection substrate 2822 are positioned opposite each other such that the redirecting element 2820 and the protection substrate 2822 are angled toward each other. The fluid 2824 is introduced into the protection system 2812 and is forced through the delivery conduit 2814 toward the redirecting element 2820. At least a portion of and in some embodiments a majority of the fluid is redirected by the redirecting element 2820 toward the protection substrate 2822. In some embodiments, the protection substrate comprises a grid of apertures 512 or other features as described herein. Typically, the redirecting element 2820 does not include the grid of apertures. In some embodiments, at least a percentage of the fluid 2824 is generally redirected by the redirecting element 2820 at an oblique angle relative to the surface of the protection substrate 2822 and with sufficient force and volume such that some fluid is forced into the apertures 512 of the grid at a rate to limit or prevent damage to the protection substrate, similar to the protection described above with other embodiments. Further, some of the fluid delivered through the delivery conduit 2814 is typically passed back through the removal conduit 2816. For example, in some embodiments, about 10% of the fluid returns along the removal conduit. More or less fluid may be passed back through the removal conduit depending on the size of the removal conduit, the amount of fluid delivered, the amount of fluid redirected and other such factors. In some embodiments the removal conduit may be replaced with a rod, beam or other structure to position the protection substrate.

The protection system 2812 can be substantially any size and is typically configured relative to the object being tooled. For example, in some embodiments, the distance 2914 across both the delivery and removal conduits 2814, 2816 secured in position by the registers can be in the range of 1 mm-2 mm (e.g., 1.5 mm) Similarly, the diameter 2916 of the delivery conduit and/or removal conduit can be about 100-1000 microns in some embodiments. The diameters of the delivery and removal conduits, however, do not have to be the same and can be substantially any size depending on many factors, such as but not limited to the size of the area into which the protection substrate 2822 is to be positioned, the amount of fluid desired, the laser intensity and/or pulse rate, and/or other such factors. Accordingly, the distance 2914 across the two conduits also varies depending on implementation, and can be substantially any relevant size that fits within the cavity of the object being laser machined while delivering sufficient fluid 2824 and provide protection to the interior surface of the cavity (e.g., a backwall).

The protection system 2812 is positioned within an object to be laser machined with the protection substrate 2822 positioned such that the laser 2912 impinges upon the protection substrate 2822 after having passed through a machined surface of the object. In many implementations, the laser 2912 may further impinge upon and burn through the redirecting element 2820. However, damage to the redirecting element 2820 caused by the laser is typically minimal relative to its function and does not adversely interfere with the capability of the redirecting element 2820 to redirect the fluid 2824 toward the protection substrate 2822.

The registers 2830-2832 are spaced along at least a portion of the length of the protection system 2812. In some embodiments, the registers are secured in positions along the conduits 2814, 2816, for example, through epoxy 2840, solder, adhesive, clamp, or other such materials or structures. The registers are configured, in at least some embodiments, with dimensions to allow at least some of the registers to be inserted into the object to be laser machined and to aid in positioning and maintaining a position of the protection substrate 2822 relative to the surface of the object to be protected. Additionally, in some embodiments, the registers 2830-2832 further maintain the positioning of the delivery conduit 2814 relative to the removal conduit 2816.

FIG. 31 illustrates a simplified, partial cross-sectional view of a portion of the protection system 2812 of FIG. 28 positioned within an exemplary object 3110 being laser machined (e.g., fuel injector), in accordance with some embodiments. FIG. 32 shows a simplified, cross-section view of the protection system 2812 of FIG. 31 at axis A-A, in accordance with some embodiments. The positioning of the protection substrate 2822 in many embodiments is critical, in part because of the relatively small size of the protection substrate, the small size of the laser being used to perform the machining, and in many instances the small size of the object being laser machined and/or the area or cavity into which the protection system and protection substrate can be positioned. Accordingly, the registers 2830-2832 can be configured to provide additional positioning of the protection substrate 2822 relative to the object 3110 being laser machined. The registers can be substantially any configuration and/or shape depending on the object intended to be laser machined and the cavity into which the protection is to be inserted.

The protection system 2812 is position, in the example of FIG. 31-32, such that the redirecting element 2820 and protection substrate 2822 are adjacent the object 3110 and in some instances in contact with the inner surface of the object 3110. Further, in some implementations, the protection system 2812 is configured such that the ends of the protection substrate 2822 and/or the redirecting element 2820 are intended to contact the object 3110 (e.g., at a closed end 3112) to help in registering and/or positioning the protection substrate 2822 within the cavity of the object. Additionally, when inserted into some objects 3110, the shape and/or configuration of the object where the protection substrate is positioned may cause the redirecting element 2820 and/or the protection substrate 2822 to be flexed or forced closer together. Accordingly, in some embodiments, there might be very little or no space between the inner surface of the object 3110 and the outer surfaces of the redirecting element 2820 and/or the protection substrate 2822.

Further, the registers 2830-2832 additionally aid in positioning the protection system 2812 and the protection substrate 2822 in a desired location relative to the object 3110 being laser machined. In some embodiments, an additional register may be positioned to ensure the protection substrate 2822 is only inserted into the cavity a desired depth. Other such registers, structures or other measurement devices can be used in positioning the protection system 2812 and protection substrate 2822.

As shown in the example of FIGS. 31-32, the object 3110 has a cylindrical configuration with a circular cross-section and tapers toward a point at a closed end 3112. The laser machining, in this implementation, is intended to occur proximate the closed end. In this configuration, the registers 2830-2832 can have a generally circular configuration to correspond to the generally circular cross-section. As shown in FIG. 32, the register 2830 has a generally circular outer circumference 3214 and surrounds the delivery and removal conduits 2814, 2816. Again, in some embodiments, the shape of the registers 2830-2832 can be dictated by the shape of the cavity into which the protection system 2812 is to be inserted. For example, when the size of the cavity is relatively small, the gap 3124 can be very small (e.g., 200 microns or less). In some implementations, there may be no portion of the register between a conduit and the inner surface of the object 3110.

Additionally, in some embodiments, one or more the registers 2830-2832 can include one or more cutouts 3216, apertures or other such structures, or be formed of a grid or other porous material. The cutouts 3216 (or other such structure) allow the fluid 2640 to pass the registers to exit the object 3110 being laser machined. It is noted that FIG. 32 shows the delivery and removal conduits 2814, 2816 positioned substantially at a center of the circular diameter of the register 2830. In other embodiments, however, the delivery and/or removal conduit can be positioned off center relative to the register 2830. For example, the delivery and removal conduits can be positioned off center and proximate the outer circumference 3214 of the register 2830 or even at the outer circumference. This configuration, in some embodiments, can allow the protection substrate 2822 to be positioned further from the focus of the laser 2912, which reduces the intensity of the laser at the protection substrate.

The registers 2830-2832 can be constructed of substantially any relevant material that can be formed and/or tooled in a desired shape, can cooperate with the conduits, and can withstand the fluid and resulting temperatures. For example, in some implementations the registers can be formed of a metal or metal alloy, plastic, ceramic, glass, silicon, or other such material or combination of materials.

Referring back to FIG. 30, the protection system 2812 is threaded through the channel or bore 3012 of the mounting apparatus 3010 to be directed into the cavity of the object 3110. In some embodiments, the mounting apparatus 3010 further includes a clamp 3014 or other such device to secure the protection system 2812 into a fixed position when inserted into the object 3110 at a desired location and/or depth. As described above, the delivery conduit 2814 can include a fluid connector 3016 to couple with a fluid source to supply the fluid 2824 into the protection system 2812 and accordingly the cavity of the object 3110 being laser machined. A mounting structure 3020 can also be included to position the mounting apparatus 3010 relative to a holder that holds the object 3110 to be laser machined. In some embodiments, once the protection system 2812 is positioned within the object 3110 and aligned relative to the laser 2912, the object 3110 can be rotated around the protection system 2812 when the object is to be laser machined or drilled in multiple locations. Accordingly, the laser system and protection system do not have to be repositioned.

Further, the protection system 2812 can be reused for numerous laser machining (e.g., multiple laser drillings in a single object) and typically with numerous different objects (e.g., multiple objects with multiple laser drillings in each object). There are many factors that affect the number of times a protection substrate 2822 and/or protection system 2812 can be used, such as but not limited to the intensity of the laser 2912, the distance the protection substrate 2822 is from the focus of the laser 2912, the pulse patterns of the laser, the accuracy of detecting penetration of the laser through the tooled surface of the object and other such factors.

In performing laser machining, which in some instances can be performed consistent with one or more of the processes, methods and/or using the control systems described above, the laser 2912 is directed at one or more desired locations of the object 3110 (e.g., proximate a closed end 3112 of the object). Once a hole 3114 is formed in the wall of the object 3110 the laser enters the cavity of the object and can impinge upon the opposite or back wall 3116. The protection system 2812 is positioned within the cavity with the protection substrate 2822 such that the laser 2912 is incident upon the protection substrate. As described above, the fluid 2824 is redirected by the redirecting element 2820 to impact the surface of the protection substrate 2822 upon which that the laser is impinging. The fluid can increase reflectivity of the protection substrate, dissipates heat caused by the laser 2912, restricts the expansion of plasma formed at the surface of the protection substrate thereby helping to reduce the increase in local laser absorption, and provide other advantages.

Some embodiments may further include an exterior gas assist jet source 3120, which in some implementations is coaxial with the laser 2912. The gas source 3120 can direct a flow of gas (e.g., air) toward the hole 3114 being laser drilled, which in part remove debris during laser machining and/or inhibit fluid 2824 in the cavity from entering the hole once drilled. In some embodiments, the protection system 310 further includes a gas conduit 340, which is configured to also be positioned within the cavity 318. Further, the gas flow conduit can be positioned relative to a portion of the cavity where the hole 330 is being drilled. A gas, such as air, oxygen or other relevant gas can be directed into the cavity to limit, and in some instances, prevent the liquid supplied by the delivery conduit 2814 from entering the hole 3114 once formed by the laser machining. In some embodiments, the redirecting element 2820 provides additional protection against the gas flows (e.g., from the exterior gas assist jet source 3120 and/or from an internal gas assist jet source when present).

FIG. 33A shows simplified, cross-sectional view of a portion of a laser protection system 3312, in accordance with some embodiments. FIG. 33B illustrates a simplified, partial cross-sectional view of a portion of the laser protection system 3312 of FIG. 33A positioned within an exemplary object 3110 being laser machined, in accordance with some embodiments. The protection system 3312 includes the protection system 2812 of FIGS. 28-32 and further includes a coaxially aligned internal gas assist jet source 3314. In some embodiments, the internal gas assist jet source 3314 comprises a conduit or tube with the protection system 2812 positioned within the tube. A gas 3316 (e.g., air, nitrogen, etc.) is directed around the protection system 2812 to be emitted at an end 3320 of the internal gas assist jet source 3314 proximate the redirecting element 2820 and protection substrate 2822. The amount of gas supplied and/or the pressure at which the gas is supplied can vary depending on the implementation. Typically, however, the pressure is maintained at a level to avoid blowing the fluid 2824 off the protection substrate 2822, while aiding in preventing the fluid from entering the hole 3114 (or the like) being laser drilled. In some embodiments, for example, the gas can be supplied at a pressure of less than 15 psi.

In some embodiments, this protection system 3312 can be utilized with the mounting apparatus 3010 of FIG. 30, the positioning holder 712 of FIG. 7, and/or other such mounting or positioning systems.

In some embodiments, the protection system 3312 can include a first set of registers 2830-2831 similar to the registers in FIGS. 28 and 31 to position the delivery and removal conduits relative to the tube of the internal gas assist jet source 3314. Some embodiments additionally include a second set of registers 3330-3331 that are configured, at least in part, to position the protection system 3312 relative to the object 3110 being laser machined. Again, the second set of registers 3330-3331 allows the gas 3316 to pass through or around the registers. For example, in some embodiments, the second set of registers 3330-3331 can include one or more cutouts, holes, or other such structure to allow the gas to pass.

Again, during laser machining, the laser 2912 generates the hole 3114 through the wall of the object 3110 with the protection substrate 2822 positioned such that the laser impinges upon the protection substrate. As described above, the laser may further cause a hole in the redirecting element 2820 but the protection substrate 2822 provides protection for the opposite surface of the object. The redirecting element 2820 continues to redirect the fluid while providing some protection from the gas dispersing adverse amounts of the fluid from the surface of the protection substrate 2822.

FIG. 34A shows simplified, cross-sectional view of a portion of a laser protection system 3412, in accordance with some embodiments. FIG. 34B illustrates a simplified, partial cross-sectional view of a portion of the laser protection system 3412 of FIG. 34A positioned within an exemplary object being laser machined, in accordance with some embodiments. The protection system 3412 includes a fluid conduit 3414 extending to a closed end 3416. A protection substrate 3422 is further included, and typically positioned proximate the closed end 3416. In some embodiments, the protection substrate 3422 includes a grid of apertures 512, is porous and/or otherwise allows the fluid 2824 to pass through to the exterior of the protection substrate. Further, in some embodiments, the protection substrate can be arranged at an oblique angled relative to the conduit 3414 and/or can be dependent on the expected angle of the laser 2912. The fluid 2824 is supplied to the interior of the conduit 3414 with a pressure sufficient to cause the fluid to flow out of the protection substrate 3422 through the grid of apertures 312.

In some embodiments, the protection substrate 3422 is formed in a cap 3424 that forms the closed end and into which the grid of holes are formed. The protection substrate can be formed to be as substantially any angle relative to the conduit 3414, and typically is formed depending on an expected object to be laser machined and the angle of the laser entering the cavity. Additionally, in some implementations, the thickness of the protection substrate 3422 can be increased relative to the dimensions of the conduit because of the thickness of the cap 3424. In some embodiments, a recess or cavity 3426 can be formed in the cap 3424 to form the thickness of the protection substrate 3422. Similarly, in some embodiments, the angle of the recess 3426 relative to the conduit 3414 can correspond to the angle of the exterior surface of the protection substrate. In other embodiments, the angle of the recess 3426 may deviate from the angle of the protection substrate resulting in a change in thickness of the protection substrate. The cap and/or protection substrate can be formed of substantially any relevant material, such as those described above. For example, in some embodiments, the cap 3424 and protection substrate 3422 can be formed of Inconel®.

The protection system 3412 is positioned within an object 3110 to be laser machined at a position such that the laser 2912 impinges upon the protection substrate 3422 and fluid 2824 being emitted through the protection substrate. In some embodiments, the protection substrate 3422 is positioned at a maximum distance from the focus of the laser while still in position to provide protection for the opposite surface of the object 3110. Further, in many embodiments, the diameter of the conduit 3414 and thus the cap 3424 may be smaller than some other protection systems. For example, in some embodiments, the diameter of the conduit 3414 may be less than 100 microns, and in some embodiments less than 50 microns. This can allow the protection substrate 3422 to be positioned, in at least some configurations, further away from the focus of the laser 2912. Some embodiments further include one or more spacers or registers 2830-2831. Again, the registers 2830-2831 can provide precision positioning of the protection substrate 3422 relative to the wall of the object 3110 to be laser machined. Further, the registers can be configured with cutouts, apertures or other structure to allow the fluid 2824 to exit the object 3110.

Figure 35:
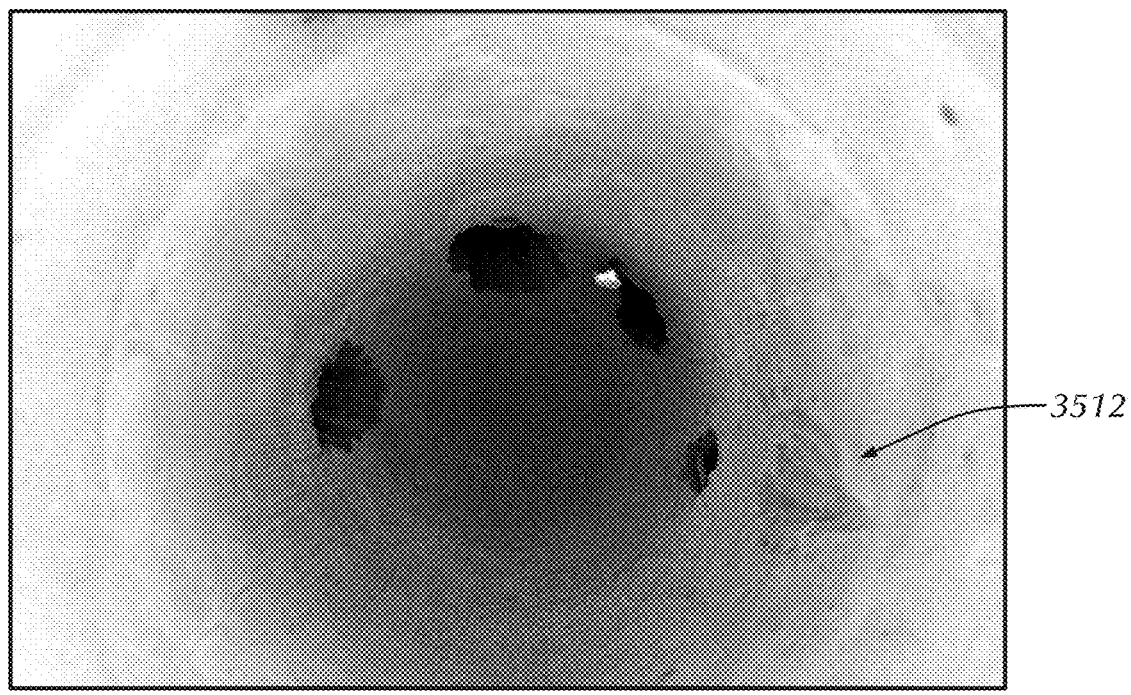
FIG. 35 shows an image of an object with laser damage as a result of laser machining performed without backwall protection.
Figure 36:
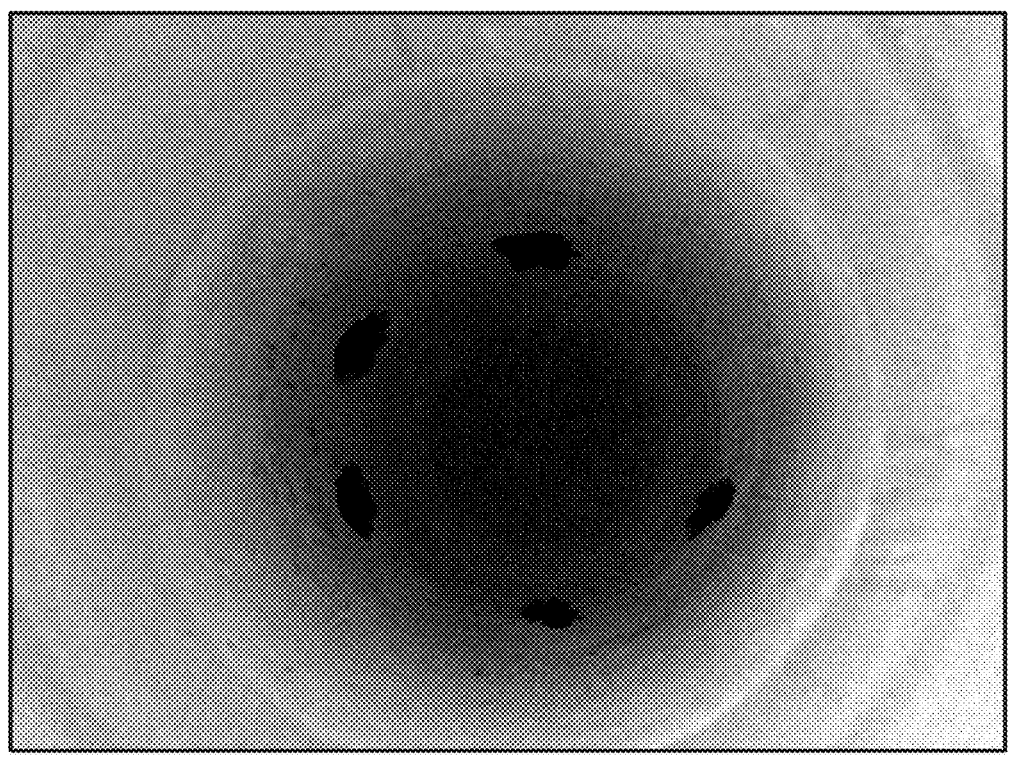
FIG. 36 shows an image of an object without backwall damage after laser machining was performed while backwall protection in accordance with some embodiments.

FIG. 35 shows an image of an object 3110 with laser damage 3512 as a result of laser machining performed without backwall protection. FIG. 36 shows an image of an object 3110 without backwall damage after laser machining was performed while backwall protection in accordance with some embodiments was utilized. Accordingly, the protection systems of the present embodiments provide significant protection of objects being laser machined.

One or more of the embodiments, methods, processes, approaches, and/or techniques described above or below may be implemented in one or more computer programs executable by a processor-based system. By way of example, such a processor based system may comprise the processor based system 2510, a computer, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described steps, processes or techniques to protect a backwall surface of an object while laser machining. As another example, such computer programs may be used for implementing any type of machine or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Many of the functional units described in this specification have been labeled as systems, devices or modules, in order to more particularly emphasize their implementation independence. For example, a system may be implemented as a hardware circuit comprising custom VLSI circuits or gate arrays, off-the-shelf semiconductors such as logic chips, transistors, or other discrete components. A system may also be implemented in programmable hardware devices such as field programmable gate arrays, programmable array logic, programmable logic devices or the like.

Systems may also be implemented in software for execution by various types of processors. An identified system of executable code may, for instance, comprise one or more physical or logical blocks of computer instructions that may, for instance, be organized as an object, procedure, or function. Nevertheless, the executables of an identified system need not be physically located together, but may comprise disparate instructions stored in different locations which, when joined logically together, comprise the system and achieve the stated purpose for the system.

Indeed, a system of executable code could be a single instruction, or many instructions, and may even be distributed over several different code segments, among different programs, and across several memory devices. Similarly, operational data may be identified and illustrated herein within systems, and may be embodied in any suitable form and organized within any suitable type of data structure. The operational data may be collected as a single data set, or may be distributed over different locations including over different storage devices, and may exist, at least partially, merely as electronic signals on a system or network.

Some embodiments provide methods of laser machining comprising: positioning a protection substrate within a cavity of an object to be laser machined such that a laser pulse performing laser machining is incident upon a first surface of the protection substrate when the laser pulse passes through a hole in the object and enters the cavity, and inhibiting the laser pulse from impinging on a surface of the object across the cavity from the hole; directing a fluid onto the first surface of the protection substrate as the laser pulse is incident upon the first surface; and directing laser pulses at a first surface of the object after positioning of the protection substrate within the cavity of the object. In some implementations, the fluid is substantially free of laser-barrier properties at the wavelength of the laser pulses upon delivery into the cavity by the fluid source.

Other embodiments provide systems in protecting a backwall or other surface of an object during laser machining. These systems can comprise: a laser system configured to perform laser machining of an object; a control system cooperated with the laser system; and a fluid source configured to be positioned relative to a cavity of the object to be laser machined and to direct a fluid into the cavity of the object; wherein the control system is configured to control the laser system such that the laser system generates a series of laser pulses and to control which of the series of laser pulses are directed at a portion of the object where a hole is to be produced such that less than all of the laser pulses are directed at the object where a timing between pulses that are directed at the object provide protection of a backwall of the object from damage that would otherwise be caused by one or more of the laser pulses directed at the object.

While the invention herein disclosed has been described by means of specific embodiments, examples and applications thereof, numerous modifications and variations could be made thereto by those skilled in the art without departing from the scope of the invention set forth in the claims.

What is claimed is:

1. A method of protecting a surface during laser machining, comprising:
   directing a fluid into a cavity of an object being laser machined, wherein the fluid does not have laser absorption properties;
   directing a plurality of laser pulses at a wall of the object being laser machined, wherein the plurality of laser pulses are configured to form a hole through the wall such that at least one laser pulse of the plurality of laser pulses passes through the hole and enters the cavity while the fluid is directed into the cavity such that the at least one laser pulse is incident on the fluid and a surface together in order to inhibit backwall damage; and positioning a protection substrate having the surface within the cavity such that the at least one laser pulse passing through the hole and into the cavity is incident upon the surface of the protection substrate, wherein the protection substrate comprises a grid of apertures wherein the apertures extend through a full thickness of the protection substrate;

wherein the directing the fluid into the cavity comprises directing the fluid to be in contact with the surface of the protection substrate upon which the at least one laser pulse is incident.

2. The method of claim 1, wherein the positioning the protection substrate comprises:

positioning a fluid redirecting element, coupled with a fluid source, juxtaposed to the protection substrate;

directing the fluid to be in contact with the surface of the protection substrate comprises directing the fluid to directly impinge upon the fluid redirecting element, wherein at least a portion of the fluid is redirected by the redirecting element to impinge upon the surface of the protection substrate at an oblique angle.

3. The method of claim 1, further comprising:

rotating the protection substrate relative to the direction of the plurality of laser pulses such that multiple laser pulses of the plurality of laser pulses passing through the hole are distributed over the protection substrate.

4. The method of claim 1, wherein the directing the plurality of laser pulses at the wall of the object comprises:

producing a series of laser pulses; and controlling which of the laser pulses are directed at the object such that less than all of the series of laser pulses are directed at the object.

5. The method of claim 1, wherein the positioning the protection substrate having the surface comprises positioning the protection substrate with the surface of the protection substrate positioned at an oblique angle to a direction of the plurality of laser pulses and upon which the at least one laser pulse is incident.

6. The method of claim 1, wherein the positioning the protection substrate comprises positioning the protection substrate such that the laser pulses of the plurality of laser passing through the hole formed in the wall impinge upon one or more of the apertures upon passing through the hole.

7. The method of claim 1, wherein the apertures of the grid are each tapered along an axis of each of the apertures.

8. The method of claim 1 wherein the surface of the protection substrate upon which the at least one laser pulse is incident comprises a material that is at least partially reflective.

9. The method of claim 1, further comprising:

positioning a protection substrate within the cavity of the object such that the at least one laser pulse directed at the wall of the object in performing the laser machining is incident upon the protection substrate when the at least one laser pulse passes through the hole in the object formed through the laser machining and enters the cavity, wherein the at least one laser pulse is inhibited from impinging on a back surface of the object across the cavity from the hole; and positioning a fluid source relative to the protection substrate;

wherein the directing the fluid into the cavity comprises directing the fluid onto the protection substrate.

10. The method of claim 9, wherein the fluid is substantially free of laser-barrier properties upon delivery into the cavity by the fluid source at wavelengths of the plurality of laser pulses.

11. The method of claim 10, wherein the fluid comprises one or more of water, super cooled water, alcohol, and liquid nitrogen.

12. The method of claim 9, wherein the positioning the protection substrate having the surface comprises positioning the protection substrate proximate an exit aperture of the fluid source such that the fluid is directed directly at the protection substrate and directly impacts the surface of the protection substrate on which the at least one laser pulse is incident.

13. The method of claim 9, wherein the fluid source comprises a fluid delivery conduit and a redirecting element positioned relative to an end of the fluid delivery conduit, wherein the positioning the fluid source comprises positioning the redirecting element juxtaposed to the protection substrate; and wherein the directing the fluid into the cavity comprises directing fluid to contact the redirecting element and redirecting, through contact with the redirecting element, at least a portion of the fluid to contact the surface of the protection substrate upon which the at least one laser pulse is incident.

14. The method of claim 13, wherein the positioning the protection substrate comprises positioning the protection substrate through one or more registers secured about at least the fluid delivery conduit such that the at least one laser pulse impinges upon the protection substrate.

15. The method of claim 13, further comprising:

positioning an internal gas assist jet source fixed about and coaxially aligned with at least a portion of a length of the fluid delivery conduit proximate the redirecting element; and releasing a flow of gas through the internal gas assist jet source relative to the hole in the object being formed through the laser machining.

16. A method of protecting a surface during laser machining, comprising:

directing a fluid into a cavity of an object being laser machined, wherein the fluid does not have laser absorption properties;

directing a plurality of laser pulses at a wall of the object being laser machined, wherein the plurality of laser pulses are configured to form a hole through the wall such that at least one laser pulse of the plurality of laser pulses passes through the hole and enters the cavity while the fluid is directed into the cavity such that the at least one laser pulse is incident on the fluid and a surface together in order to inhibit backwall damage;

configuring a laser source relative to the object being laser machined;

controlling the laser source to produce a series of laser pulses while implementing the directing the fluid into the cavity;

controlling which of the laser pulses of the series of laser pulses are directed at the object such that less than all of the laser pulses of the series of laser pulses are directed at the object wherein a timing between a plurality of pulses that are directed at the object provide protection of a backwall of the object from damage that would otherwise be caused by one or more of the laser pulses directed at the object and passing through the hole; and positioning a protection substrate having the surface within the cavity such that the at least one laser pulse passing through the hole and into the cavity is incident upon the surface of the protection substrate, wherein the protection substrate comprises a grid of apertures wherein the apertures of the grid of apertures extend through a full thickness of the protection substrate;

wherein the directing the fluid into the cavity comprises directing the fluid to be in contact with the surface of the protection substrate upon which the at least one laser pulse is incident.

17. The method of claim 16, wherein the controlling which of the laser pulses of the series of laser pulses are directed at the object comprises directing a first burst of laser pulses at the object, preventing two or more subsequent bursts of laser pulses from impinging on the object and directing a second burst of laser pulses following the two or more subsequent bursts of laser pulses.

18. A method of protecting a surface during laser machining, comprising:
directing a fluid into a cavity of an object being laser machined, wherein the fluid does not have laser absorption properties;
directing a plurality of laser pulses at a wall of the object being laser machined, wherein the plurality of laser pulses are configured to form a hole through the wall such that at least one laser pulse of the plurality of laser pulses passes through the hole and enters the cavity while the fluid is directed into the cavity such that the at least one laser pulse is incident on the fluid and a surface together in order to inhibit backwall damage;
configuring a laser source relative to the object being laser machined;
controlling the laser source to produce a series of laser pulses while implementing the directing the fluid into the cavity; and
controlling which of the laser pulses of the series of laser pulses are directed at the object such that less than all of the laser pulses of the series of laser pulses are directed at the object wherein a timing between a plurality of pulses that are directed at the object provide protection of a backwall of the object from damage that would otherwise be caused by one or more of the laser pulses directed at the object and passing through the hole;
wherein the controlling which of the laser pulses of the series of laser pulses are directed at the object comprises directing a first burst of laser pulses at the object, preventing two or more subsequent bursts of laser pulses from impinging on the object and directing a second burst of laser pulses following the two or more subsequent bursts of laser pulses;
wherein the directing the first burst of laser pulses and the second burst of laser pulses at the object comprises directing the first burst of laser pulses and the second burst of laser pulses at the object such that a timing between the first burst of laser pulses and the second burst of laser pulses is configured to allow bubbles formed by one or more laser pulses of the first burst of laser pulses and proximate the surface, which comprises an interior backwall surface of the object, opposite the hole to collapse such that substantially an entire area of the backwall surface upon which one or more laser pulses of the first burst of laser pulses impinges is in contact with the fluid when the second burst of laser pulses is directed at the object.

19. The method of claim 16, wherein the fluid is substantially free of laser-barrier properties at a wavelength of the series of laser pulses upon delivery of the fluid into the cavity.

20. The method of claim 1, wherein the directing the fluid into the cavity comprises directing the fluid into an interior of the protection substrate such that the fluid is forced out of the apertures of the grid of apertures to an exterior of the protection substrate.

21. The method of claim 1, wherein the apertures of the grid of apertures are arranged such that the exterior surface of the protection substrate is substantially open.

22. The method of claim 1, further comprising:
configuring a laser source relative to the object being laser machined;
controlling the laser source to produce a series of laser pulses while implementing the directing the fluid into the cavity; and
controlling which of the laser pulses of the series of laser pulses are directed at the object such that less than all of the laser pulses of the series of laser pulses are directed at the object wherein a timing between a plurality of pulses that are directed at the object provide protection of a backwall of the object from damage that would otherwise be caused by one or more of the laser pulses directed at the object and passing through the hole.

23. The method of claim 21, wherein the surface of the protection substrate comprises a reflective material.

24. The method of claim 8, wherein the material is at least partially reflective such that a surface of each of the apertures upon which the at least one laser pulse is incident reflects at least a portion of the at least one laser pulse along the aperture.

* * * * *